US012207007B2

(12) United States Patent
Yun et al.

(10) Patent No.: US 12,207,007 B2
(45) Date of Patent: Jan. 21, 2025

(54) IMAGE SENSOR, PROCESSOR OF IMAGE SENSOR, AND IMAGE PROCESSING METHOD

(71) Applicant: Samsung Electronics Co., Ltd., Suwon-si (KR)

(72) Inventors: Eunseung Yun, Suwon-si (KR); Gyeonghan Cha, Suwon-si (KR); Jaehyuck Kang, Suwon-si (KR); Daechul Kwon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 182 days.

(21) Appl. No.: 18/162,943

(22) Filed: Feb. 1, 2023

(65) Prior Publication Data

US 2023/0254474 A1 Aug. 10, 2023

(30) Foreign Application Priority Data

Feb. 8, 2022 (KR) .................. 10-2022-0016429
Jul. 5, 2022 (KR) .................. 10-2022-0082761

(51) Int. Cl.
*H04N 25/69* (2023.01)
*H04N 17/00* (2006.01)
*H04N 25/78* (2023.01)

(52) U.S. Cl.
CPC ........... *H04N 25/69* (2023.01); *H04N 17/002* (2013.01); *H04N 25/78* (2023.01)

(58) Field of Classification Search
CPC ....... H04N 17/002; H04N 25/69; H04N 25/78
See application file for complete search history.

(56) References Cited

U.S. PATENT DOCUMENTS

| 8,054,320 B1 | 11/2011 | Clark et al. |
| 2012/0251013 A1 | 10/2012 | Porikli |
| 2013/0293724 A1* | 11/2013 | Martinussen .......... H04N 25/68 348/175 |
| 2015/0130899 A1 | 5/2015 | Koizumi et al. |
| 2015/0138397 A1 | 5/2015 | Campbell et al. |
| 2016/0345005 A1* | 11/2016 | Hoekstra .............. H04N 17/002 |

FOREIGN PATENT DOCUMENTS

| KR | 100428590 B1 | 4/2004 |
| KR | 20070095000 A | 9/2007 |

\* cited by examiner

*Primary Examiner* — Lin Ye
*Assistant Examiner* — Chriss S Yoder, III
(74) *Attorney, Agent, or Firm* — Myers Bigel, P.A.

(57) ABSTRACT

An image sensor includes a test image generator configured to receive pixel data of a group of pixels including channel that corresponds to a size of a plurality of row regions of a pixel array that includes the plurality of row regions and a plurality of column regions, and is configured to generate test image data based on the pixel data, and an interface configured to transmit the test image data from the test image generator to a test device. The test image generator is configured to divide the pixel data into a first column region corresponding to 2n-th column region of the column regions of the pixel data and a second column region corresponding to 2n−1-th column region of the column regions of the pixel data and configured to generate a test image based on the first column region.

19 Claims, 25 Drawing Sheets

FIG. 9B

| rowN-1 | A0 | A1 | A2 | A3 | A4 | A5 | A6 | A7 | B0 | B1 | B2 | B3 | B4 | B5 | B6 | B7 | ... | H0 | H1 | H2 | H3 | H4 | H5 | H6 | H7 |
| rowN | A'0 | A'1 | A'2 | A'3 | A'4 | A'5 | A'6 | A'7 | B'0 | B'1 | B'2 | B'3 | B'4 | B'5 | B'6 | B'7 | ... | H'0 | H'1 | H'2 | H'3 | H'4 | H'5 | H'6 | H'7 |

IMAGE SENSOR, PROCESSOR OF IMAGE SENSOR, AND IMAGE PROCESSING METHOD

CROSS-REFERENCE TO RELATED APPLICATIONS

This application is based on and claims priority under 35 U.S.C. § 119 to Korean Patent Application No. 10-2022-0016429, filed on Feb. 8, 2022, and Korean Patent Application No. 10-2022-0082761, filed on Jul. 5, 2022, in the Korean Intellectual Property Office, the disclosures of which are incorporated by reference herein in their entireties.

BACKGROUND

The inventive concept relates to an image sensor, a processor of the image sensor, and an image processing method, and more particularly, to a method of generating test image data for performance evaluation of the image sensor.

An image sensor is a device for capturing a two-dimensional image or a three-dimensional image of an object. The image sensor generates an image of an object by using a photoelectric conversion element that responds to intensity of light reflected from the object.

Recently, the importance of performance evaluation of the image sensors has increased. However, the environment for evaluating performance of sensors is different from the environment in which actual image sensors operate, and thus, a technique for accurately evaluating the performance of the image sensors is required.

SUMMARY

The inventive concept provides an image processing method for accurately evaluating performances of image sensors by adjusting a capacity and a speed of pixel data which is transmitted to an image sensor test device through an interface, and an image sensor that performs the image processing method, and a processor of the image sensor.

According to some embodiments of the inventive concept, there is provided an image sensor including a test image generator configured to receive pixel data of a group of pixels including a channel that corresponds to a size of a plurality of row regions of a pixel array, the pixel array includes the plurality of row regions and a plurality of column regions, and the test image generator is configured to generate test image data based on the pixel data, and an interface configured to transmit the test image data from the test image generator to a test device. The test image generator is configured to divide the pixel data into a first column region corresponding to a 2n-th column region of the column regions of the pixel data and a second column region corresponding to a 2n-1-th column region of the column regions of the pixel data and configured to generate a test image based on the first column region.

According to some embodiments of the inventive concept, there is provided an image processing method for inspecting performance of an image sensor including a plurality of row regions and a plurality of column regions in a pixel array, the image processing method including receiving pixel data in units of channels that correspond to sizes of the row regions, generating test image data based on the pixel data, and transmitting the test image data to a test device. The generating the test image data includes dividing the pixel data into a first column region corresponding to a 2n-th column region of the column regions of the pixel data and a second column region corresponding to a 2n-1-th column region of the column regions of the pixel data, and a test image is generated based on the first column region.

According to some embodiments of the inventive concept, there is provided a processor of an image sensor, the processor including a test image generator configured to receive pixel data of a group of pixels including a channel that corresponds to a size of a plurality of row regions of a pixel array including the plurality of row regions and a plurality of column regions, and the test image generator is configured to generate a test image data, and an interface configured to transmit the test image data from the test image generator to a test device. The test image generator is configured to divide the pixel data into a first column region corresponding to a 2n-th column region of the column regions of the pixel data and a second column region corresponding to a 2n-1-th column region of the column regions of the pixel data and configured to generate a test image based on the first column region.

BRIEF DESCRIPTION OF THE DRAWINGS

Embodiments of the inventive concept will be more clearly understood from the following detailed description taken in conjunction with the accompanying drawings in which:

FIG. 9B illustrates that pixel data is input in the order of row region, according to some embodiments;

DETAILED DESCRIPTIONS

Figure 1:
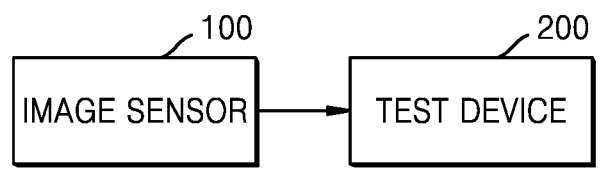
FIG. 1 is a block diagram illustrating an image sensor inspection system according to some embodiments.

Terms used in the present specification will be briefly described, and embodiments will be described in detail.

The terms used in the disclosed embodiments have been selected as currently widely used general terms as possible by considering the functions in the disclosed embodiments, which may change depending on intention of a person skilled in the art or a precedent, emergence of a new technology, and so on. In addition, in a certain case, there are also terms randomly selected by the applicant, and in this case, the meaning will be described in detail in the corresponding description. Therefore, terms used in the disclosed embodiments should be defined based on meaning of the terms and contents of the present specification, rather than simple names of the terms.

Terms including an ordinal number, such as first, second, and so on, may be used to describe various components, but the components are not limited to the terms. Terms are used only for the purpose of distinguishing one component from another component. For example, a first component may be referred to as a second component, and similarly, a second component may also be referred to as a first component without departing from the scope of the disclosed embodiments. The term "and/or" includes a combination of a plurality of related items or any one of the plurality of related items.

Hereinafter, descriptions will be made in detail so as to be easily implemented by those skilled in the art to which the disclosed embodiments pertain with reference to the accompanying drawings. However, embodiments may be implemented in several different forms and are not limited to the embodiments described herein. In order to clearly describe the embodiments in the drawings, parts irrelevant to the description are omitted, and similar reference numerals are attached to similar parts throughout the specification.

Figure 2:
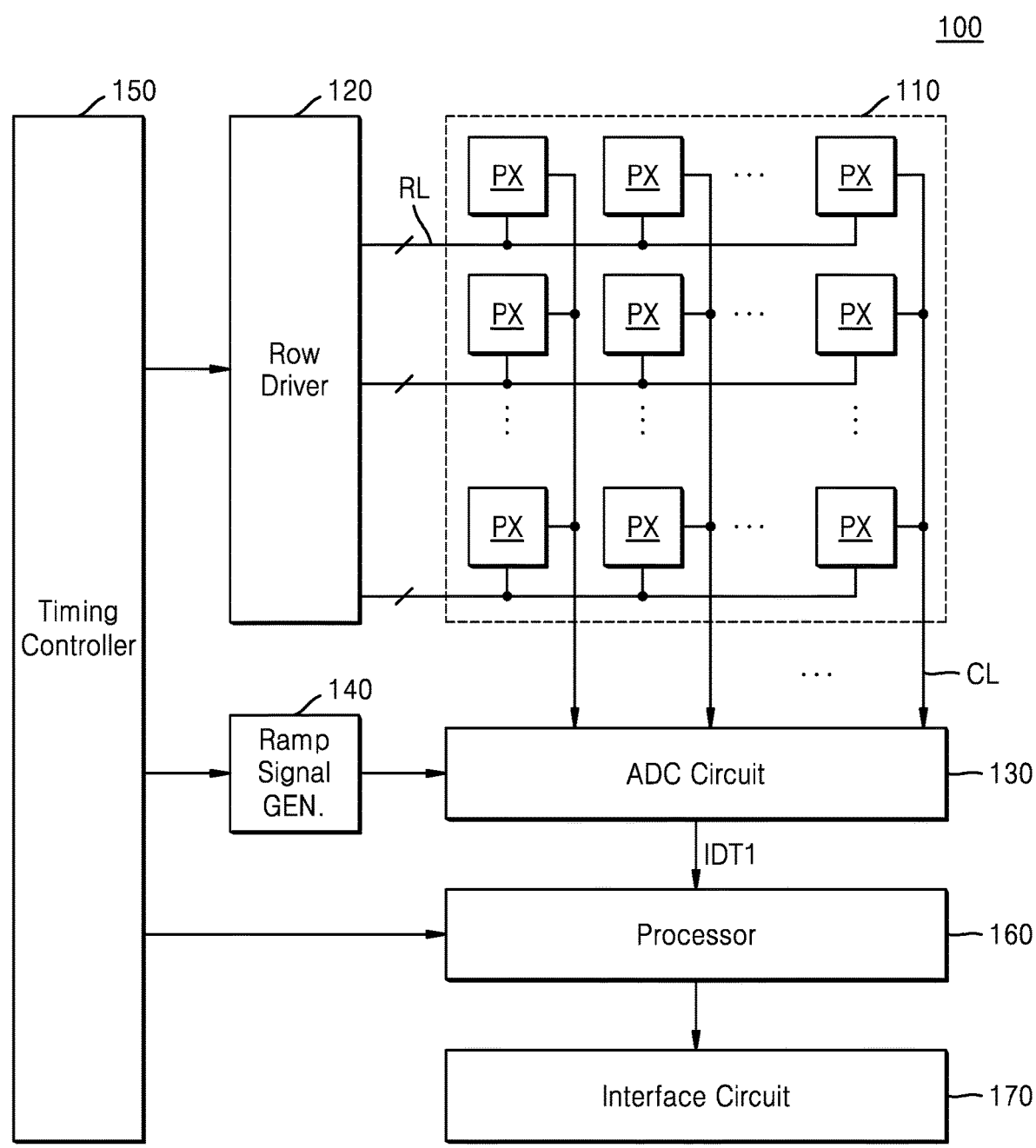
FIG. 2 is a block diagram illustrating an image sensor according to some embodiments.

FIG. 1 is a block diagram illustrating an image sensor inspection system 1 according to some embodiments, and FIG. 2 is a block diagram illustrating an image sensor 100 according to some embodiments.

Referring to FIGS. 1 and 2, the image sensor inspection system 1 according to the embodiment includes the image sensor 100 and a test device 200.

Referring to FIG. 2, the image sensor 100 includes a pixel array 110, a row driver 120, an analog-to-digital conversion circuit 130 (hereinafter, referred to as an ADC circuit), a ramp signal generator 140, a timing controller 150, a processor 160, and an interface 170.

The pixel array 110 includes a plurality of pixels PX arranged in a matrix, a plurality of row lines RL, and a plurality of column lines CL respectively connected to the plurality of pixels PX. Each of the plurality of pixels PX may include at least one photoelectric conversion element (or referred to as a photo-sensing element). The photoelectric conversion element may sense light and convert the sensed light into photo-charges. For example, the photoelectric conversion element may be a photo-sensing element, which is composed of an organic material or an inorganic material, such as an inorganic photodiode, an organic photodiode, a perovskite photodiode, a phototransistor, a photogate or a pinned photodiode. In some embodiments, each of the plurality of pixels PX may include a plurality of photoelectric conversion elements. The plurality of photo-sensing elements may be arranged on the same layer or may also be stacked in directions perpendicular to each other.

A micro lens for light collection may be arranged over each of the plurality of pixels PX or each of pixel groups including adjacent pixels PX. Each of the plurality of pixels PX may detect light in a spectrum region from light received through the micro lens.

The pixel array 110 according to some embodiments may include pixels having a red, green, and blue (RGB pattern) or a red, green, blue, white color (RGBWC) pattern. For example, the pixel array 110 may include red pixels that convert light in a red spectrum region into an electrical signal, green pixels that convert light in a green spectrum region into an electrical signal, and blue pixels that convert light in a blue spectrum region into an electrical signal. In addition, the pixel array 110 may include white pixels that convert light having all components in the red spectrum region, the green spectrum region, and the blue spectrum region into electrical signals. A color filter through which light is transmitted in a certain spectrum region may be over each of the plurality of pixels PX. However, the inventive concept is not limited thereto, and the pixel array 110 may include pixels that convert lights in spectrum regions other than red, green, and blue into electrical signals.

The plurality of pixels PX according to some embodiments may also have a multi-layer structure. The pixel PX having a multi-layer structure includes stacked photo-sensing elements that convert lights in different spectrum regions into electrical signals, and electrical signals corresponding to different colors may be generated from the photo-sensing elements. In other words, electrical signals corresponding to a plurality of colors may be output from one pixel PX.

In addition, the pixel array 110 may include a plurality of row lines and a plurality of column lines. The plurality of row lines RL may each extend in a row direction and may each be connected to pixels PX in the same row. For example, each of the plurality of row lines RL may transmit a control signal output from the row driver 120 to elements included in the pixels PX, for example, each of a plurality of transistors in the row.

The plurality of column lines CL may extend in a column direction and may be connected to the pixels PX in the same column. Each of the plurality of column lines CL may transmit pixel signals output from the pixels PX, for example, reset signals and sensing signals, to the ADC circuit 130 in units of columns of the pixel array 110.

The row driver 120 generates control signals for driving the pixel array 110 under the control of the timing controller 150 and provide the control signals to each of the plurality of pixels PX of the pixel array 110 through the plurality of row lines RL. The row driver 120 may control the plurality of pixels PX of the pixel array 110 to sense light incident at the same time or in units of rows. In addition, the row driver 120 may select the pixels PX in units of rows or in units of at least two rows from among the plurality of pixels PX, and the selected pixels PX output pixel signals through the plurality of column lines CL.

The ADC circuit 130 may receive a plurality of pixel signals read out from the plurality of pixels PX in a row selected by the row driver 120 among the plurality of pixels PX and may convert the plurality of pixel signals into a plurality of pixel values which are digital data.

The ADC circuit 130 may convert the plurality of pixel signals received from the pixel array 110 through the plurality of column lines CL into digital data based on a ramp signal RAMP from the ramp signal generator 140, and thus, first image data, for example, raw image data, may be generated and output in units of rows.

The ADC circuit 130 may include a plurality of ADCs corresponding to the plurality of column lines CL, and each of the plurality of ADCs may compare a pixel signal received through a corresponding column line CL with the ramp signal RAMP and generate a pixel value based on a result of the comparison. For example, the ADC may remove a reset signal from a sensing signal by using a CDS method and generate a pixel value indicating the amount of light sensed by the pixel PX.

The ramp signal generator 140 may generate the ramp signal RAMP that increases or decreases with a predetermined slope and provide the ramp signal RAMP to the ADC circuit 130.

The timing controller 150 may control timings of other components of the image sensor 100, for example, timings of the row driver 120, the ADC circuit 130, the ramp signal generator 140, and the processor 160. The timing controller 150 may provide timing signals indicating operation timing to each of the row driver 120, the ADC circuit 130, the ramp signal generator 140, and the processor 160. Embodiments of the present disclosure may be embodied in hardware and/or in software (including firmware, resident software, micro-code, etc.) that runs on a processor such as a digital signal processor, which may collectively be referred to as "circuitry," "a module" or variants thereof.

The processor 160 may process data for a plurality of pixel values input from the ADC circuit 130. The processor 160 may perform image quality compensation, binning, downsizing, etc. on the image data. Accordingly, image-processed output image data IDT1 may be generated and output in a predetermined unit.

For example, the processor 160 may process image data for each color. For example, when the image data includes a red pixel value, a green pixel value, and a blue pixel value, the processor 160 may process red pixels, green pixels, and blue pixels in parallel and/or serially to each other. In addition, the processor 160 may perform color-specific processing on image data in parallel and may also include a plurality of processing circuits.

The processor 160 may perform an operation of generating test image data to evaluate performance of an image sensor, according to some embodiments, which will be described below.

The interface 170 connects the test device 200 to the image sensor 100. An interface according to some embodiments may include a physical layer such as C-PHY or D-PHY. In addition, the interface of the inventive concept may include a physical layer based on a mobile industry processor interface (MIPI). In addition, the test device 200 may include electrical die sorting (EDS) equipment.

The image sensor 100 may be mounted in an electronic device having an image sensing function or a light sensing function. For example, the image sensor 100 may be mounted in an electronic device, such as a camera, a smartphone, a wearable device, an Internet of things (IoT) device, a home appliance, a tablet personal computer (PC), a personal digital assistant (PDA), a portable multimedia player (PMP), a navigation, a drone, an advanced driver assistance systems (ADAS), or so on. In addition, the image sensor 100 may be mounted in an electronic device that is provided as a component in a vehicle, furniture, manufacturing equipment, a door, various measurement devices, or so on.

Figure 3:
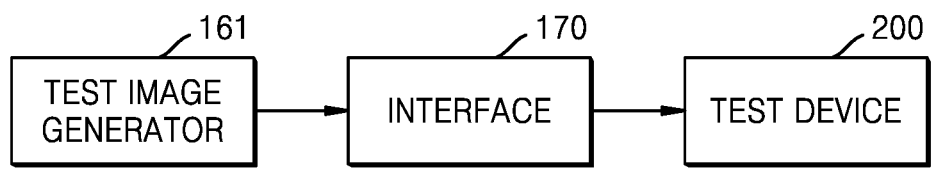
FIG. 3 is a block diagram illustrating an image sensor and a test device according to some embodiments.

FIG. 3 is a block diagram illustrating an image sensor 100 and a test device 200 according to some embodiments.

The image sensor 100 according to some embodiments includes a test image generator 161 and an interface 170. The test image generator 161 may be included in the processor 160.

The test image generator 161 receives pixel data from the pixel array 110 and generates test image data. Here, the test image generator 161 receives the pixel data in units of row regions and divides a row region of the input pixel data into a column region. A description of how the test image generator 161 receives pixel data will be made in detail with reference to FIGS. 9A and 9B.

Here, the test image generator 161 may receive input pixel data in units of channels. A channel refers to a unit in which pixel data input to the processor 160 is grouped. For example, when pixel data is input through n channels, (the number of pixels input through each channel and included in each channel)×n may be equal to a size of the input row region. In addition, n may be any natural number.

For example, the test image generator 161 may divide the input pixel data into a 2n-th column region and a 2n−1-th column region according to the order of input. In this case, the 2n-th columns may be defined as a first column region, and the 2n−1-th columns may be defined as a second column region. In addition, the test image generator 161 may divide the input pixel data into a 4n-th column region, a 4n−1-th column region, a 4n−2-th column region, and a 4n−3-th column region in the order of input. In this case, 4n-th columns may be defined as a first column region, and 4n−1-th columns may be defined as a second column region. In addition, 4n−2-th columns may be defined as a third column region, and 4n−3-th columns may be defined as a fourth column region. That is, the test image generator 161 may divide the input pixel data into a column region of 2 units or a column region of 4 units.

Embodiments for a method of dividing pixel data into predetermined column regions will be described in detail with reference to FIGS. 7A to 14. In addition, a method of dividing pixel data is not limited thereto.

The test image generator 161 according to some embodiments may generate test image data based on first column regions among the divided column regions. For example, when the 2n-th columns are defined as the first column region, the test image generator 161 may transmit the first column regions to the test device 200, and in this case, the first column regions may be combined to each other to generate a test image. In addition, when the 4n-th columns are defined as the first column region, the test image generator 161 may transmit the first column regions to the test device 200, and in this case, the first column regions may be combined to each other to generate a test image.

However, the column regions for generating the test image are not limited to the first column region, and test image data may be generated based on the second column regions. In addition, when the column regions are divided based on the 4n column region, test image data may be generated based on the second column region, the third column region, or the fourth column region.

Residual pixels may be generated depending on sizes of row regions of the pixel data input to the test image generator 161. For example, in a case in which pixel data is divided based on 2n or 4n columns in the image processing method, when it is assumed that the sizes of row regions of the input pixel data are referred to as (the number of pixels included in each channel)×n, and when the number of pixels included in each channel is not divided by 2 or 4, there may be unprocessed residual pixels. For example, when 8 pieces of pixel data are included in one channel and pixel data is input through 8 channels, a size of the input row region may include 64 pieces of pixel data but is not limited thereto. Here, when there may be residual pixels as a result of dividing column regions of the input pixel data, the test image generator 161 may additionally arrange the residual pixels after the last column among the column regions, and thus, test image data may be generated.

The interface 170 transmits the divided pixel data to the test device 200. As described above, the interface 170 according to the disclosed embodiment may include a physical layer such as C-PHY or D-PHY and may include a physical layer based on a Mobile Industry Processor Interface (MIPI).

As described above, when image data input from the pixel array 110 is divided into 2n or 4n column units, a size of the image data is reduced to ½ or ¼ of the original size. When the capacity of the image data is reduced, the capacity of the image data transmitted to the test device 200 through the interface 170 is also reduced, and the transmission speed of the test image data may be lower than the input speed of the pixel data input to the test image generator. For example, when the size of image data is reduced to ½ or ¼, a speed at which test image data is transmitted to the test device 200 through the interface 170 may be ½ or ¼ of a speed at which the pixel data is input to the test image generator 161. However, a speed at which test image data is transmitted to the test device 200 through the interface 170 is not limited thereto.

The test device 200 merges the input test image data and evaluates performance of the image sensor 100. The performance of the image sensor 100 evaluated here may include image quality, resolution, chromatic aberration, binning degree, or sensitivity of the image sensor 100 but is not limited thereto and may include other factors for evaluating the performance of the image sensor 100. In addition, the test device 200 may include EDS equipment.

Figure 4:
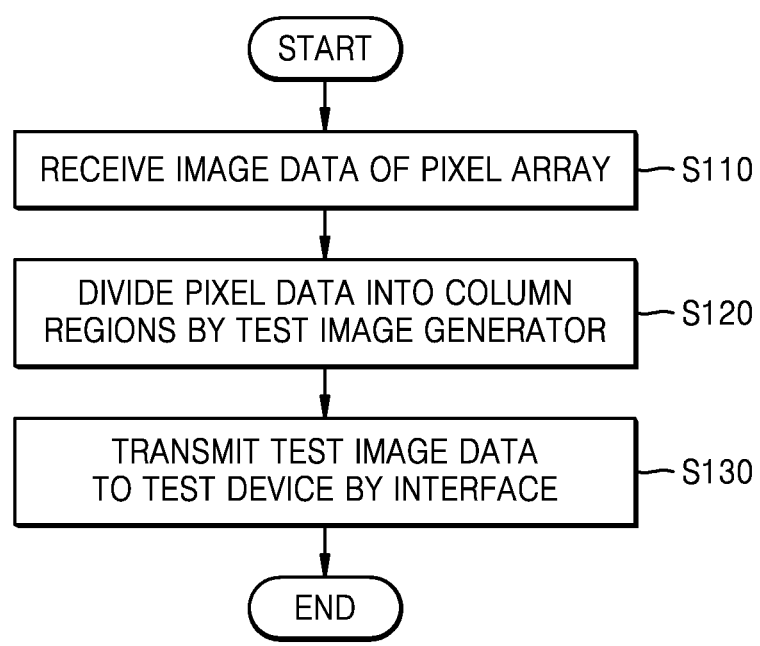
FIG. 4 is a flowchart illustrating an image processing method of an image sensor, according to some embodiments.

FIG. 4 is a flowchart illustrating an image processing method of the image sensor 100, according to some embodiments.

Referring to FIG. 4, the test image generator 161 of the image sensor 100 according to some embodiments receives image data of the pixel array 110 (S110).

Here, pixel data may be input in units of row regions of respective pixels.

When the image data of the pixel array 110 is received, the test image generator 161 divides the pixel data into column regions (S120).

For example, the test image generator 161 may divide the input pixel data into a 2n-th column region and a 2n–1-th column region in the order of input. In this case, 2n-th columns may be defined as a first column region, and 2n–1-th columns may be defined as a second column region. In addition, the test image generator 161 may divide the input pixel data into a 4n-th column region, a 4n–1-th column region, a 4n–2-th column region, and a 4n–3-th column region in the order of input.

When the pixel data is divided into column regions, the interface 170 transmits the test image data to the test device 200 (S130).

As described above, when the image data input from the pixel array 110 is divided into 2n or 4n column units, a size of the image data is reduced to ½ or ¼ of the original image. When the size of the image data is reduced, a size of the image data transmitted to the test device 200 through the interface 170 is also reduced, and a transmission speed of the test image data is less than an input speed of the pixel data input to the test image generator 161. For example, when the size of the image data is reduced by ½ or ¼, a speed at which the test image data is transmitted to the test device 200 through the interface 170 may be ½ or ¼ of a speed at which pixel data is input to the test image generator 161.

Figure 5:
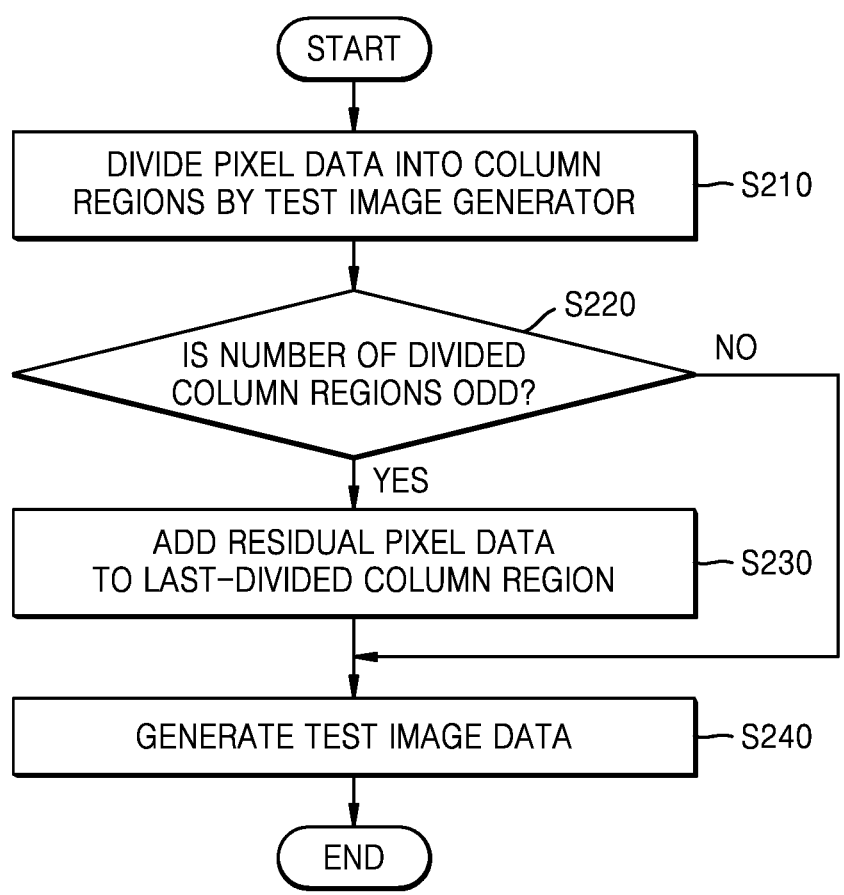
FIG. 5 is a flowchart illustrating a method of processing residual pixels of an image sensor, according to some embodiments.

FIG. 5 is a flowchart illustrating a method of processing residual pixels of the image sensor 100, according to some embodiments.

The test image generator 161 divides pixel data into column regions (S210).

When the pixel data is divided into column regions, the test image generator 161 determines whether the number of divided column regions is an odd number (S220). For example, it may be determined whether the number of pixels included in each channel is divided by 2 or 4 when a size of a row region corresponds to (the number of pixels included in each channel)×n. Here, (the number of pixels included in each channel)×n may be equal to a total size of row regions of the input pixel data. When the number of divided column regions is an odd number, the test image generator 161 adds the residual pixel data to the last-divided column region (a 2n-th column region or a 4n-th column region) (S230).

For example, when a value of {(the number of pixels included in each channel)×n} for input data is not divided by 2 or 4, the test image generator 161 processes the unprocessed residual pixel data as the last valid pixel data. For example, when a size of a row region of pixel data input to the test image generator 161 is (the number of pixels included in each channel)×n (when the number of pixels included in the channel is 7), and when the test image generator 161 generates a test image by using columns corresponding to the 2n-th column, test image data may be generated based on pixels in the 2n-th column. Here, seventh pixel data may be processed as data separate from the pixel data in the second column, the fourth column, and the sixth column.

In order to prevent unintentional pixel data from being added to the test image data, when residual pixels are generated, the test image generator 161 may process the residual pixel data from pixel data in the 2n-th column. For example, the test image generator 161 adds residual pixel data to the last-divided column region (a 2n-th column region). An image processing method related to the residual pixel processing will be described in detail with reference to FIGS. 10B, 12B, 12C, and 12D.

When the residual pixel data is added to the last column region of the pixel data, the test image generator 161 generates test image data (S240).

However, when the number of pixels included in each channel is divided into 2 or 4 in a relationship in which the size of the row region corresponds to "(the number of pixels included in each channel)×n", which are described above, are established, the test image generator 161 may generate test image data without processing the residual pixel data.

Figure 6:
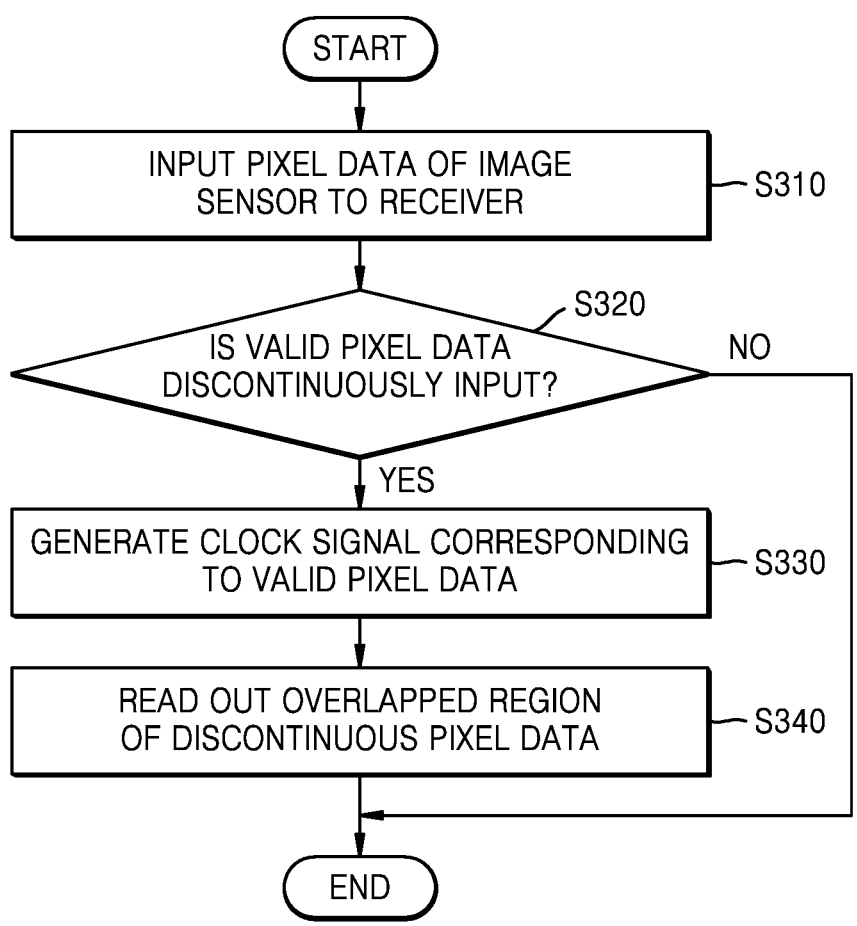
FIG. 6 is a flowchart illustrating an image processing method when pixel data is discontinuously input, according to some embodiments.

FIG. 6 is a flowchart illustrating an image processing method when pixel data is discontinuously input, according to some embodiments.

Referring to FIG. 6, pixel data of the image sensor 100 according to some embodiments is input to a receiver of the test image generator 161 (S310).

When the pixel data is input, the test image generator 161 determines whether valid pixel data is discontinuously input (S320). The valid pixel data exists in a 2n-th column region or a 4n-th column region and refers to pixel data that is read out and extracted to generate test image data.

When the valid pixel data is continuously input, an input speed of the pixel data is constant, and the test image generator 161 divides the pixel data into column regions and generates test image data.

However, when the valid pixel data is discontinuously input, the input speed of the pixel data is not constant, and the test image generator 161 may generate a clock signal corresponding to the valid pixel data (S330). The test image generator 161 may divide columns of the pixel data based on the clock signal corresponding to the valid pixel data. When the clock signal corresponding to the valid pixel data is generated, the test image generator 161 may divide the columns of the input pixel data even when the valid pixel data is discontinuously input.

When a clock signal corresponding to an input speed of pixel data is generated, an overlapping region of discontinuous pixel data may be read out (S340).

For example, when an input speed of first to sixth row regions is different from an input speed of seventh and eighth row regions in the pixel data input from the 8×8 pixel array 110, the test image generator 161 may adjust a clock signal for dividing columns in the seventh and eighth row regions. A method of dividing a column region by adjusting a clock signal will be described in detail with reference to FIGS. 13 and 14.

Figure 7A:
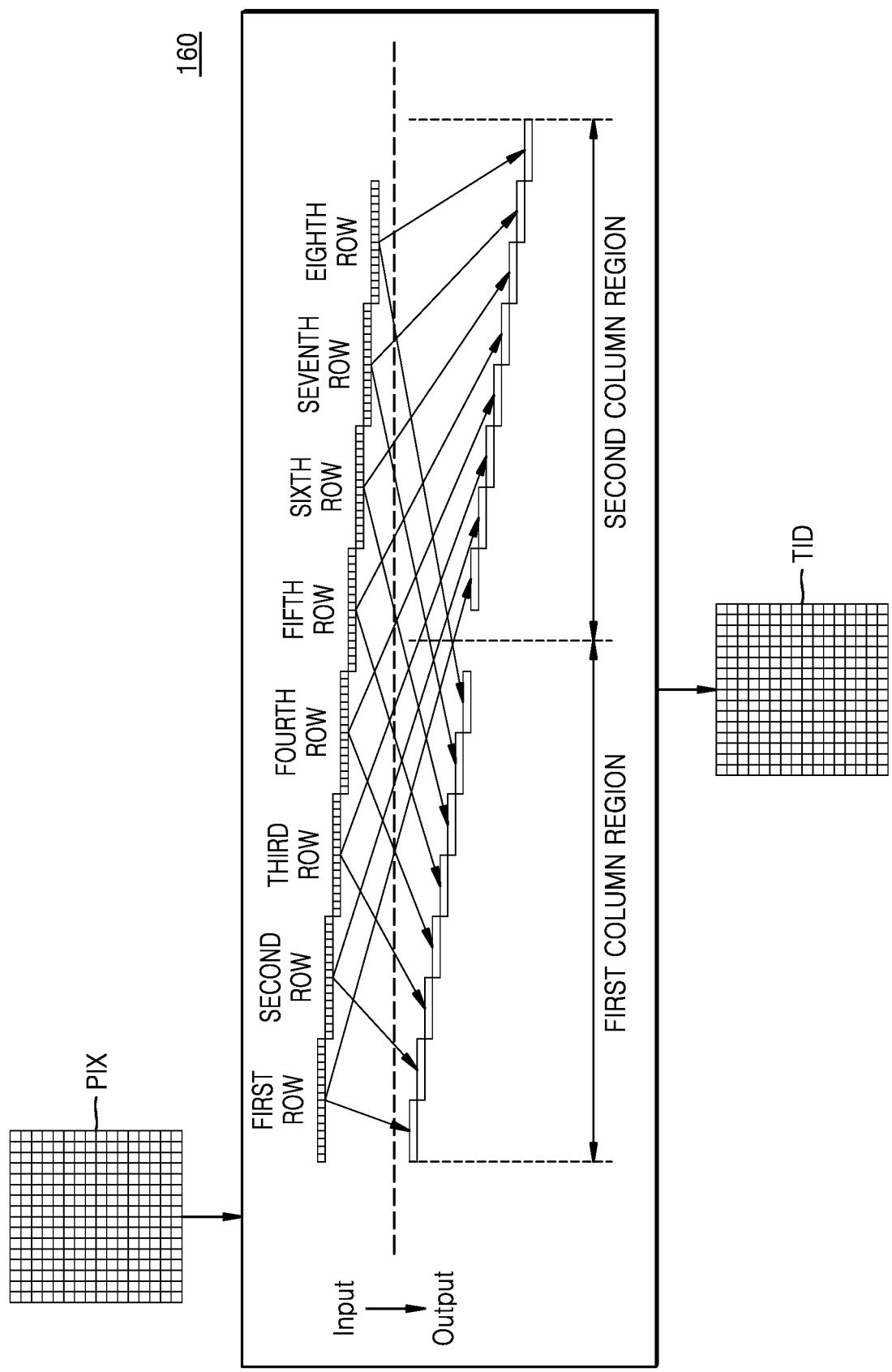
FIGS. 7A, 7B, and 7C are diagrams illustrating an image processing method of an image sensor, according to some embodiments.
Figure 7B:
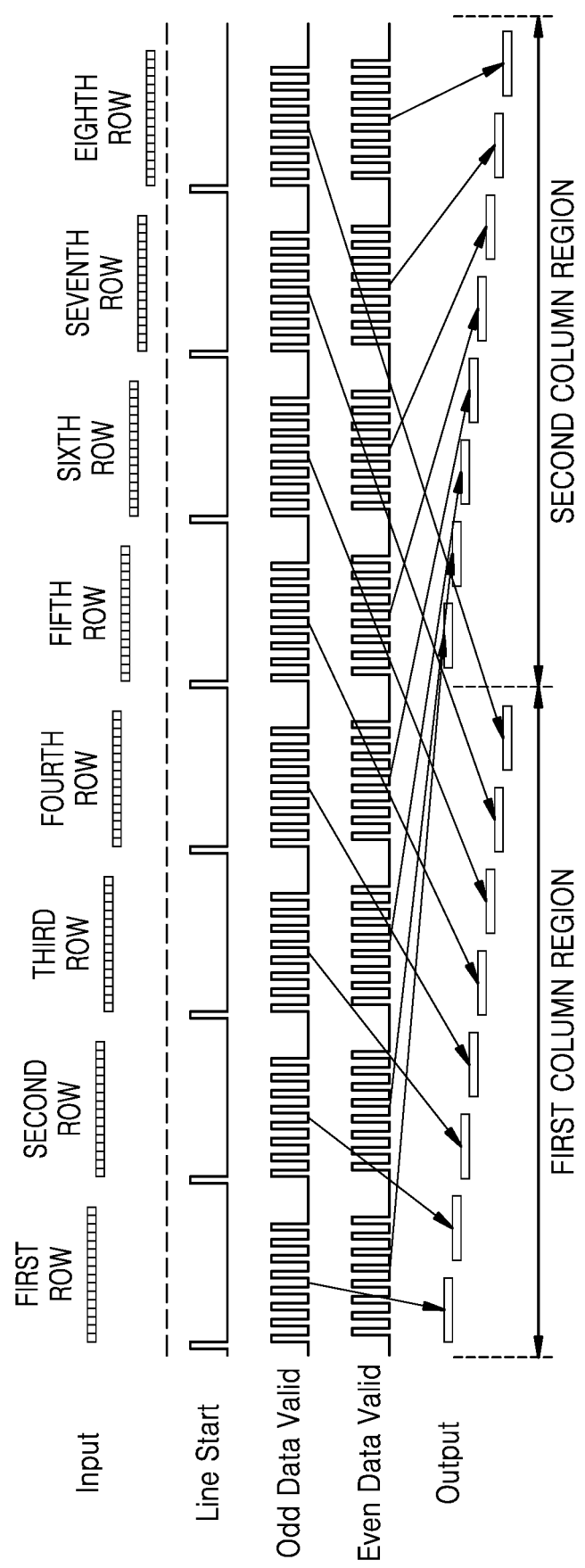
Figure 7C:
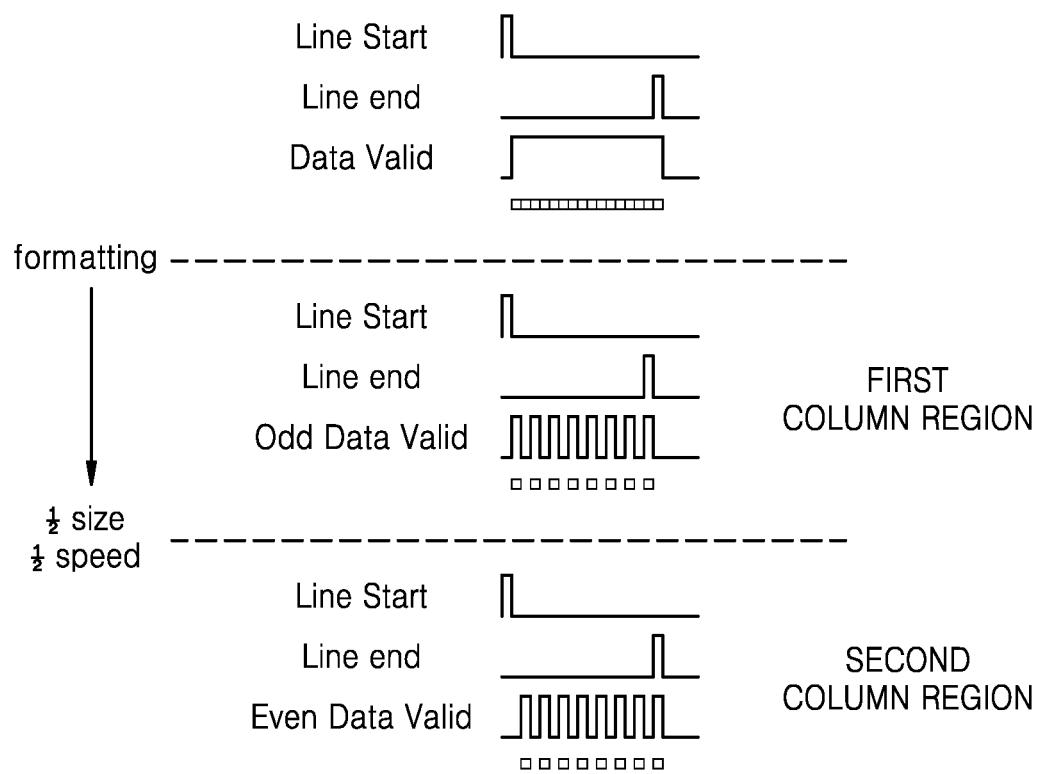
Figure 8A:
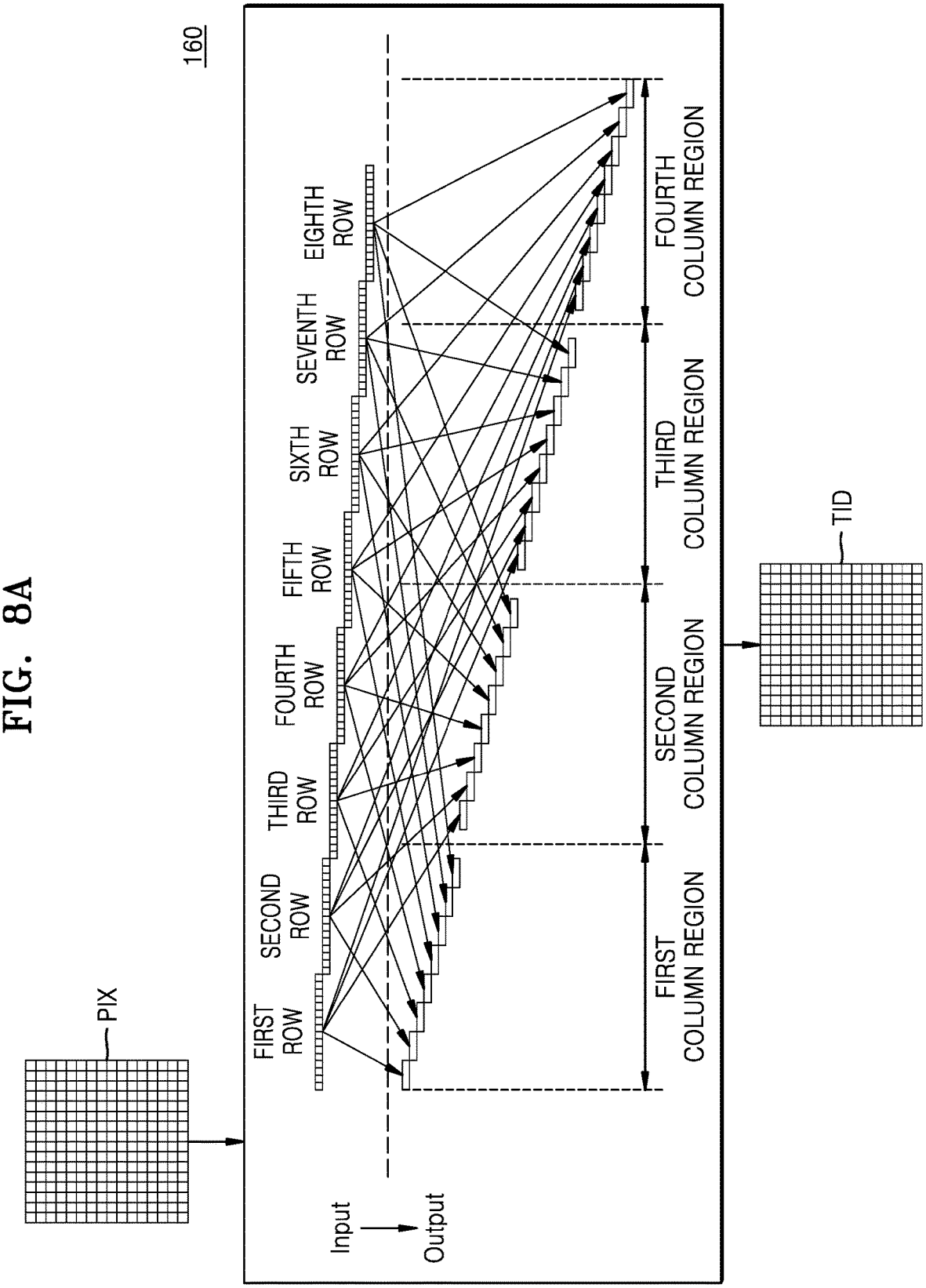
FIGS. 8A and 8B are diagrams illustrating an image processing method of an image sensor, according to some embodiments.
Figure 8B:
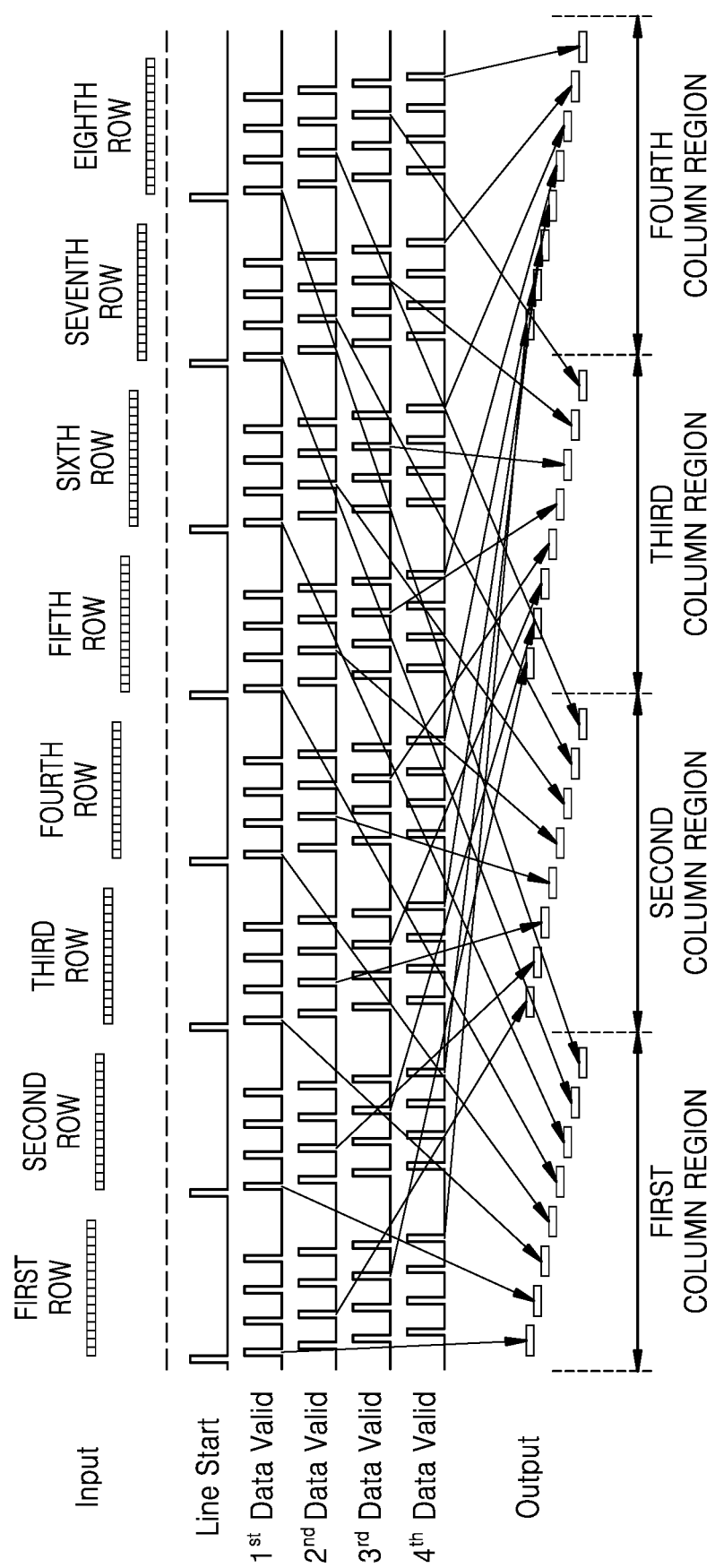

FIGS. 7A, 7B, 7C, 8A, and 8B are diagrams illustrating an image processing method of an image sensor, according to some embodiments. Specifically, FIGS. 7A, 7B, and 7C illustrate a case in which the image processing method divides pixel data based on 2n column regions, and FIGS. 8A and 8B illustrate a case in which the image processing method divides pixel data based on 4n column regions.

Referring to FIGS. 7A, 7B, 7C, 8A, and 8B, pixel data PIX is input to the processor 160 of the image sensor 100. Specifically, the pixel data PIX may be input to the test image generator 161 of the processor 160.

Referring to FIGS. 7A and 7B, the test image generator 161 receives pixel data in units of n row regions and divides the input pixel data into column regions. For example, the processor 160 may receive corresponding pixel data PIX among the pixel data PIX in the order of row region through eight channels. Here, the pixel data PIX corresponding to one row region may be input in units of each channel, and the row region corresponding to the input may be divided into first to eighth row regions.

When the row regions of pixel data are sequentially input, the test image generator 161 may divide the input pixel data into a 2n-th column region and a 2n–1-th column region in the order of input. In this case, 2n-th columns may be defined as a first column region, and 2n–1-th columns may be defined as a second column region. When the column regions are divided, the test image generator 161 may transmit test image data TID generated based on each column region to the test device 200 through the interface 170.

The processor 160 receives the pixel data PIX through n channels. When the pixel data PIX is input, the test image generator 161 of the processor 160 may generate a readout start signal Line Start to extract pixel data of a column region in each row region. When the pixel data starts to be read out, the test image generator 161 selects valid pixel data Data Valid). For example, the test image generator 161 divides pixel data in each row region into odd-numbered valid pixel data Odd Data Valid and even-numbered valid pixel data Even Data Valid in the order of input and reads out the divided valid pixel data. That is, the test image generator 161 may generate output data Output by classifying pixel data in the row region of the input pixel data into 2n-th pixel data and 2n–1-th pixel data. Here, in this case, 2n-th columns may be defined as a first column region, and 2n–1-th columns may be defined as a second column region. However, units in which the processor 160 divides the row region are not limited to a 2n-th pixel or a 2n–1-th pixel, and 4n-th, 4n–1-th, 4n–2-th, and 4n–3-th pixels may also be classified in the same manner as in the above-described example embodiment.

FIG. 7C illustrates in more detail that the processor 160 derives output data based on input data. Referring to FIG. 7C, by dividing pixel data into a first column region and a second column region, the processor 160 may reduce a size of the transmitted image data by half compared to a case in which original image data is transmitted as it is. As a result of reduction in size of the transmitted image data, the processor 160 may reduce an image data transmission speed by half compared to a case in which the original image data is transmitted as it is.

In addition, referring to FIGS. 8A and 8B, the test image generator 161 receives pixel data in units of row regions and divides a row region of the input pixel data into column regions. The test image generator 161 may divide the input pixel data into a 4n-th column region, a 4n–1-th column region, a 4n–2-th column region, and a 4n–3-th column region in the order of input. In this case, 4n-th columns may be defined as a first column region, and 4n–1-th columns may be defined as a second column region. In addition, 4n–2-th columns may be defined as a third column region, and 4n–3-th columns may be defined as a fourth column region. When the column regions are divided, the test image generator 161 may transmit test image data TID generated based on each column region to the test device 200 through the interface 170. In addition, in the same manner as in the embodiment described with reference to FIGS. 7A and 7B, the processor 160 may receive corresponding pixel data PIX among the pixel data PIX in the order of row region through n channels. Here, a row region corresponding to the input may be divided into first to eighth row regions. In addition, the test image generator 161 may divide the input pixel data into a column region of 2 units or a column region of 4 units, but the method of dividing the pixel data is not limited thereto.

The processor 160 receives the pixel data PIX through n channels. When the pixel data PIX is input, the test image generator 161 of the processor 160 may generate a readout start signal Line Start to extract pixel data of a column region in each row region. When the pixel data starts to be read out, the test image generator 161 selects valid pixel data Data Valid. For example, the test image generator 161 may read out the pixel data in each row region by classifying into 4n-th, 4n–1-th, 4n–2-th, and 4n–3-th pixels in the order of input. That is, the test image generator 161 may generate output data Output by classifying the pixel data in a row region of the input pixel data into 4n-th pixel data, 4n-1-th pixel data, 4n-2-th pixel data, and 4n-3-th pixel data. Here, in this case, 4n-th columns may be defined as a first column region, and 4n-1-th columns may be defined as a second column region. In addition, 4n-2-th columns may be defined as a third column region, and 4n-3-th columns may be defined as a fourth column region.

Figure 9A:
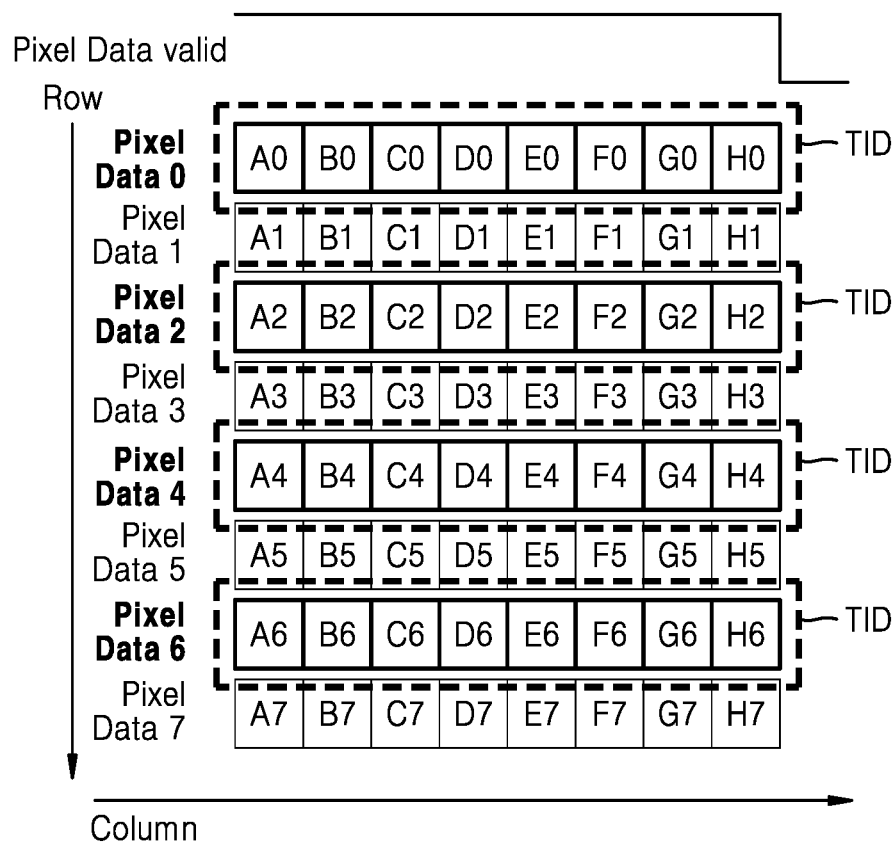
FIG. 9A illustrates a method of reading out pixel data to perform an image processing method, according to some embodiments.

FIG. 9A illustrates a method of reading out pixel data to perform an image processing method, according to some embodiments. FIG. 9B illustrates that pixel data is input in the order of row region, according to some embodiments. Specifically, FIG. 9A illustrates a case in which pixel data input to the test image generator 161 is divided into units of 2n columns.

Referring to FIGS. 9A and 9B, respective pixel data An, Bn, Cn, Dn, En, Fn, Gn, and Hn may be input in an 8×8 format. Hereinafter, for the sake of convenience, pixel data in the same row region is classified in the same alphabet, and pixel data in the same column region is classified in the same number. However, a shape of the pixel data is not limited thereto.

Referring to FIG. 9A, a vertical axis may be defined as a row region of pixel data, and a horizontal axis may be defined as a column region thereof. Referring to FIG. 9B, pixel data is input in units of row regions.

According to some embodiments, the test image generator 161 may receive pixel data in units of row regions and divide a zeroth column (Pixel Data 0), a second column (Pixel Data 2), a fourth column (Pixel Data 4), and sixth column (Pixel Data 6) into valid pixel data for generating test image data TID. Here, assuming that N is 2, pixel data input through a pixel array may be arranged in the order of the row regions A0, A1, A2, . . . , H0, H1, H2, H3, H4, H5, H6, and H7 to be input to a first input row region row 1 in FIG. 9B. In addition, the pixel data input through the pixel array may be arranged in the order of row regions A'0, A'1, A'2, . . . , H'0, H'1, H'2, H'3, H'4, H'5, H'6, and H'7 to be input to a second input row region row 2.

Referring back to FIG. 9A, the processor 160 may extract a column region in each row region among the row regions of pixel data input in the form illustrated in FIG. 9B. For example, when a zeroth column (Pixel Data 0), a second column (Pixel Data 2), a fourth column (Pixel Data 4), and sixth column (Pixel Data 6) are divided into pixel data for generating test image data TID, a first channel may include pixel data A0 to A7 corresponding to the first column region, and pixel data of the divided column region may be A0, A2, A4, and A6.

Hereinafter, a result of reading out pixel data according to the method of FIGS. 9A and 9B will be described with reference to FIGS. 10A and 10B.

Figure 10A:
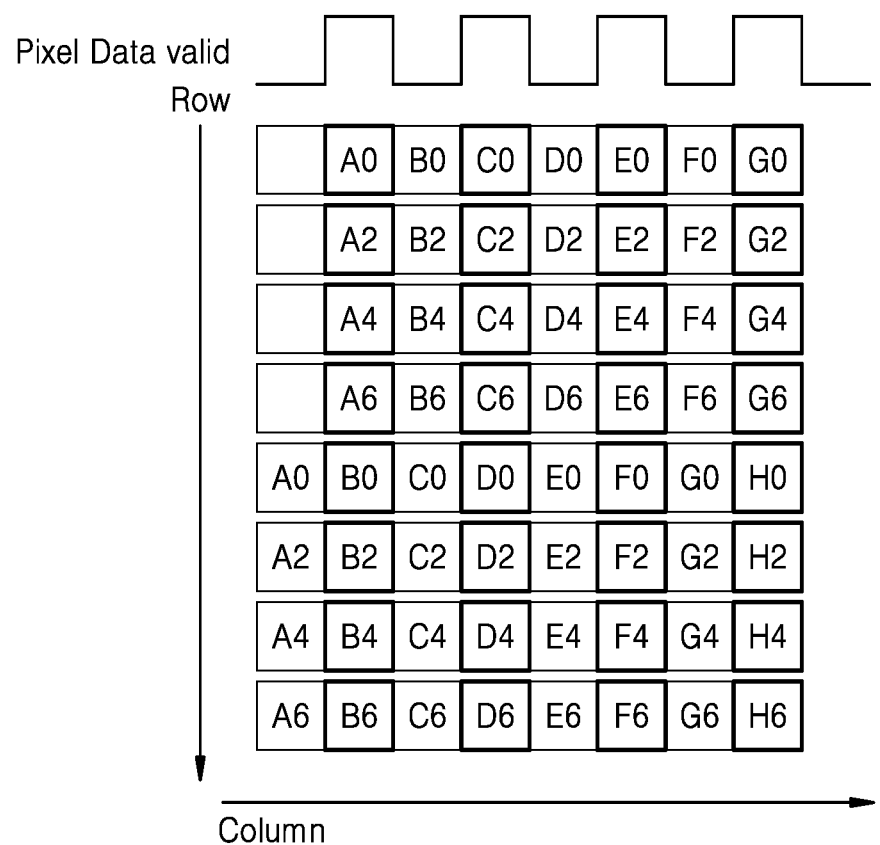
FIG. 10A illustrates a result of reading out pixel data according to an image processing method of an image sensor, according to some embodiments.
Figure 10B:
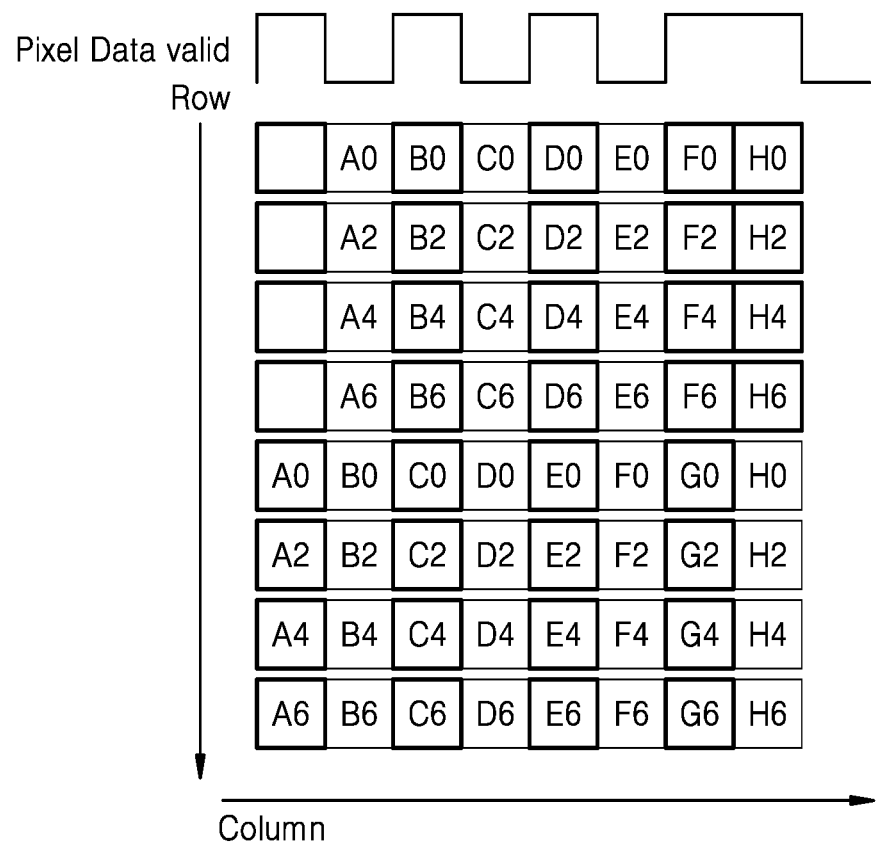
FIG. 10B is a diagram illustrating a result of reading out pixel data according to an image processing method of an image sensor, according to some embodiments.

FIGS. 10A and 10B illustrate a result of reading out pixel data according to an image processing method of an image sensor according to some embodiments. Specifically, FIG. 10A illustrates a case in which the number of columns of pixel data is 2n, and FIG. 10B illustrates a case in which the number of columns of pixel data is 2n-1.

Referring to FIG. 10A, as a result of dividing the zeroth column (Pixel Data 0), the second column (Pixel Data 2), the fourth column (Pixel Data 4), and the sixth column (Pixel Data 6) are divided into valid pixel data for generating the test image data TID, zeroth to sixth columns of each row are selected as pixel data for generating the test image data TID. When the number of columns of pixel data is 2n, even when the column region is divided, there are no residual pixels, and thus, a process of processing residual pixels are not required. Here, the processor 160 may pack in advance data A0, A2, A4, and A6 to present the data A0, A2, A4, and A6 as start data of valid pixel data, and the data A0, A2, A4, and A6 may be overlapped with the beginning of a row region.

Referring to FIG. 10B, when the number of columns of input pixel data is 2n-1, pixels H0, H2, H4, and H6 may be additionally arranged in the test image data unlike the case of FIG. 10A. Here, the processor 160 may pack in advance the data H0, H2, H4, and H6 to present the data H0, H2, H4, and H6 as the last data of the valid pixel data, and the data H0, H2, H4, and H6 may be overlapped with the last portion of a row region.

Figure 11:
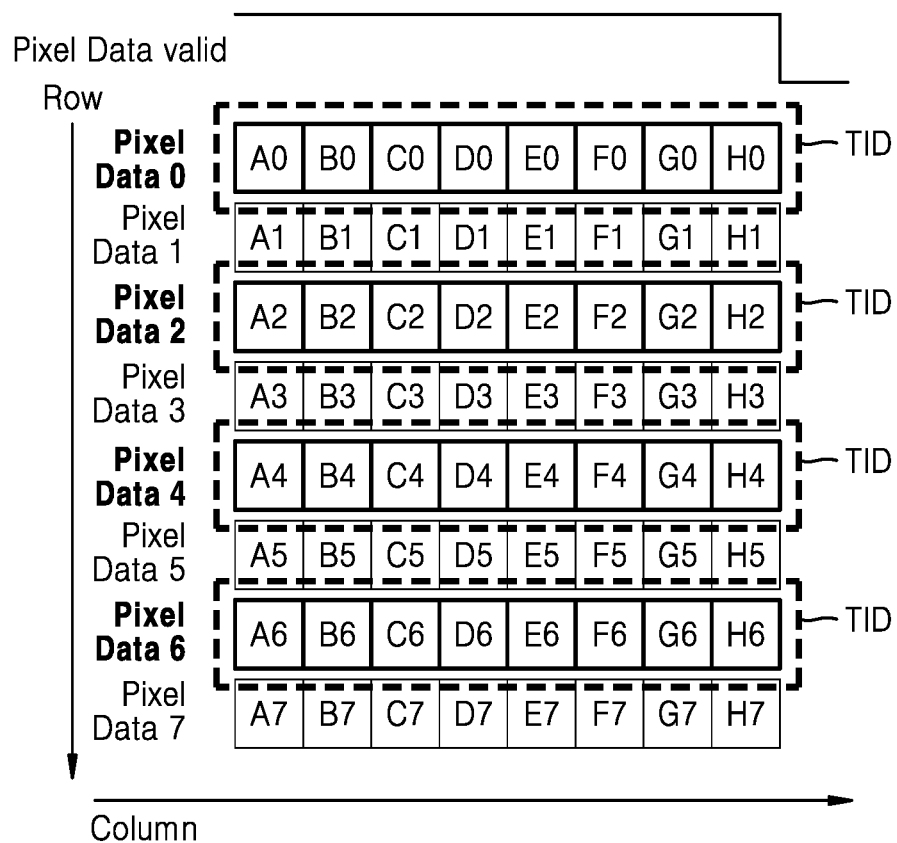
FIG. 11 is a diagram illustrating a method of reading out pixel data to perform an image processing method, according to some embodiments.

FIG. 11 is a diagram illustrating a method of reading out pixel data to perform an image processing method, according to some embodiments. Specifically, FIG. 11 illustrates a case in which pixel data input to the test image generator 161 is divided into 4n column units.

Referring to FIG. 11, the test image generator 161 may receive pixel data in units of row regions and divide a zeroth column (Pixel Data 0) and fourth column (Pixel Data 4) into valid pixel data for generating the test image data TID. Hereinafter, a result of reading out pixel data according to the method illustrated in FIG. 11 will be described with reference to FIGS. 12A to 12D.

Figure 12A:
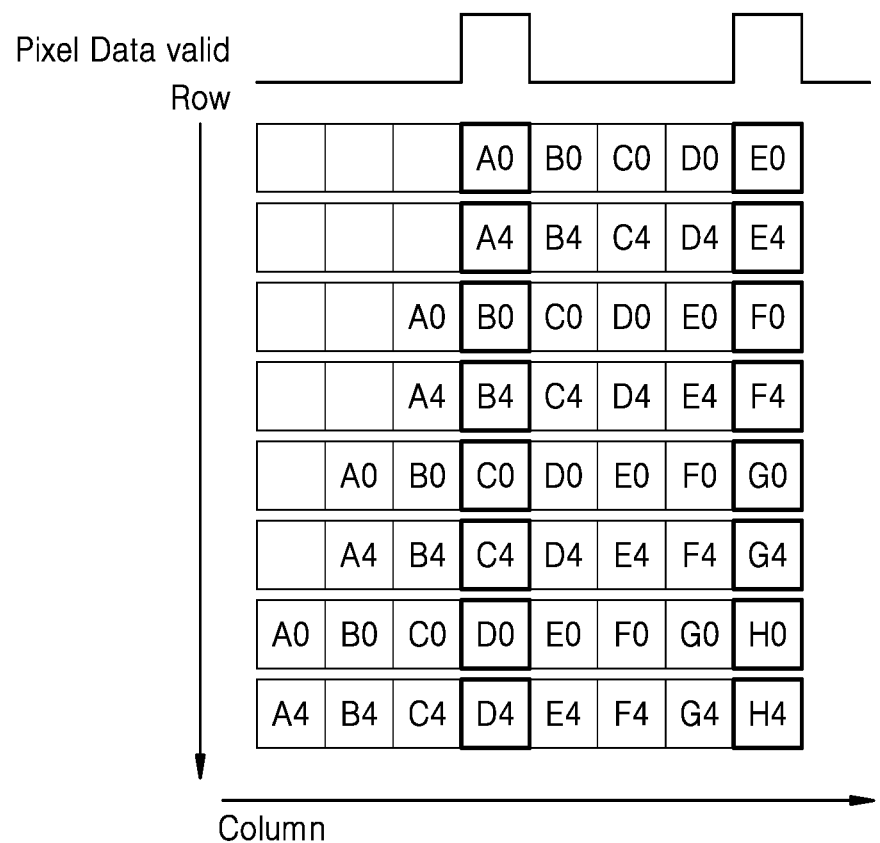
FIG. 12A illustrates a result of reading out pixel data according to an image processing method of an image sensor, according to some embodiments.
Figure 12B:
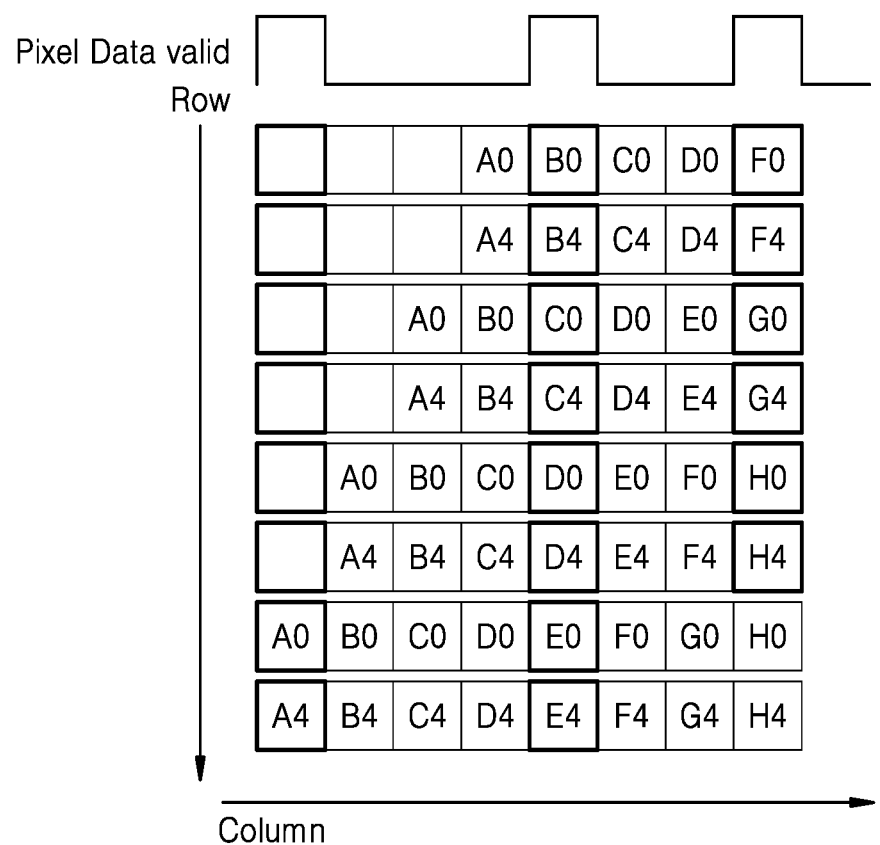
FIG. 12B illustrates a result of reading out pixel data according to an image processing method of an image sensor, according to some embodiments.

FIGS. 12A to 12B illustrate results of reading out pixel data according to an image processing method of an image sensor, according to some embodiments.

Figure 12C:
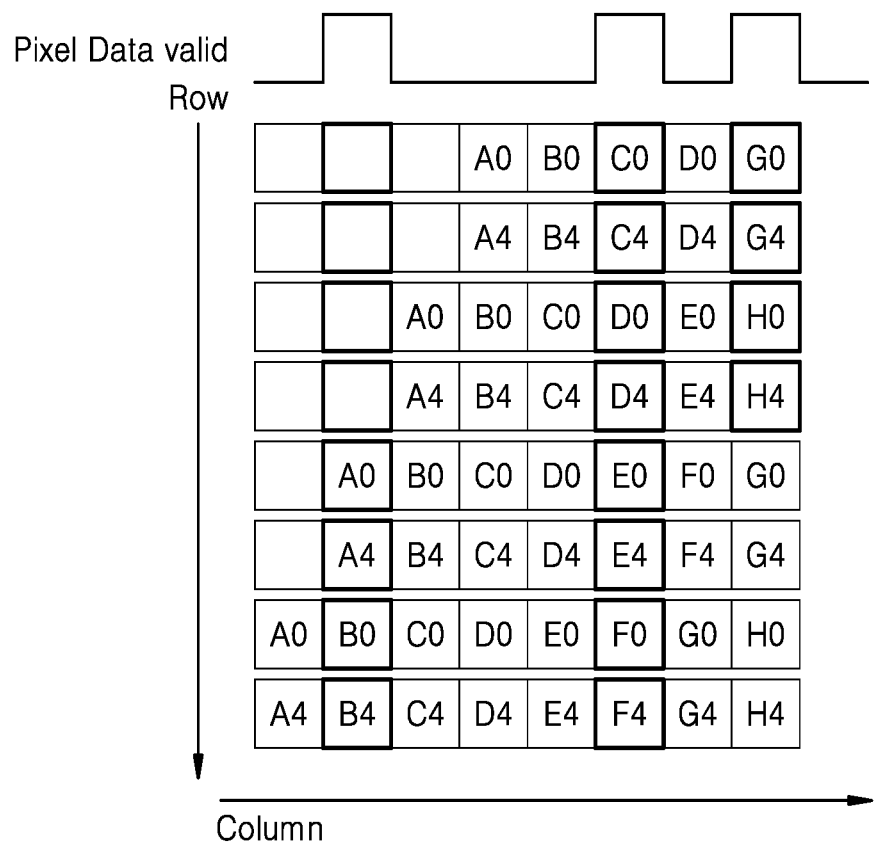
FIG. 12C illustrates a result of reading out pixel data according to an image processing method of an image sensor, according to some embodiments.
Figure 12D:
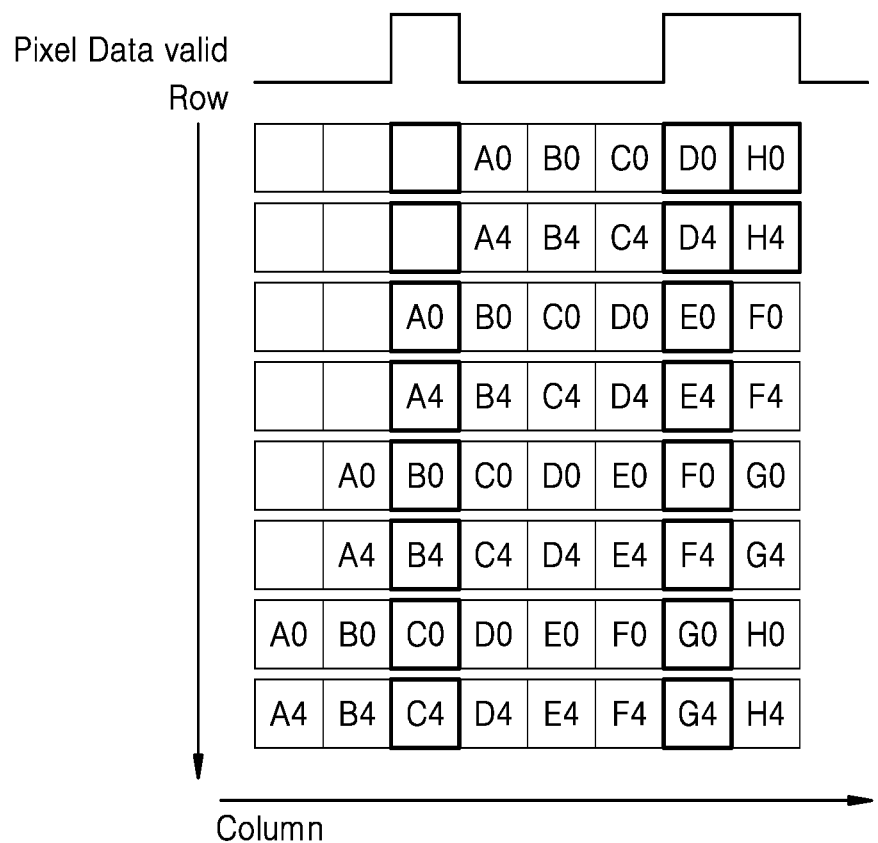
FIG. 12D is a diagram illustrating a result of reading out pixel data according to an image processing method of an image sensor, according to some embodiments.

Specifically, FIG. 12A illustrates the test image data TID when there are 4n column regions of pixel data, and FIGS. 12B to 12D illustrate the test image data TID when there are no 4n column regions of pixel data.

Referring to FIG. 12A, as a result of dividing a zeroth column (Pixel Data 0) and a fourth column (Pixel Data 4) into valid pixel data for generating the test image data TID, a zeroth columns and a fourth column of each row are selected as pixel data for generating the test image data TID. When the sum of the number of pixels included in each channel is not divided by 4 in a relationship in which the size of the total input row regions is (the number of pixels included in each channel)×n, residual pixels are not generated even when the column region is divided, and thus, a process of processing the residual pixels is not required.

Referring to FIG. 12B, the sum of the number of pixels included in each channel is not divided by 4 in a relationship in which the size of the total input row regions is (the number of pixels included in each channel)×n, and thus, pixels F0, F4, G0, G4, H0, and H4 may be additionally arranged in the test image data. Here, the processor 160 may pack in advance the pixel data of F0, F4, G0, G4, H0, and H4 to present the pixel data as the last data of the valid pixel data, and the pixels F0, F4, G0, G4, H0, and H4 may be overlapped with the last portion of a row region.

Referring to FIG. 12C, the sum of the number of pixels included in each channel is not divided by 4 in a relationship in which the size of the total input row regions is (the number of pixels included in each channel)×n, and thus, pixels G0, G4, H0, and H4 may be additionally arranged in the test image data. Here, the processor 160 may pack in advance the pixel data of F0, G0, G4, H0, and H4 to present the pixel data as the last data of the valid pixel data, and the pixels G0, G4, H0, and H4 may be overlapped with the last portion of a row region.

Referring to FIG. 12D, the sum of the number of pixels included in each channel is not divided by 4 in a relationship in which the size of the total input row regions is (the number of pixels included in each channel×n), and thus, pixels H0 and H4 may be additionally arranged in the test image data. Here, the processor 160 may pack in advance the pixel data H0 and H4 to present the pixel data as the last data of the valid pixel data, and the pixel data H0 and H4 may be overlapped with the last portion of a row region.

Figure 13:
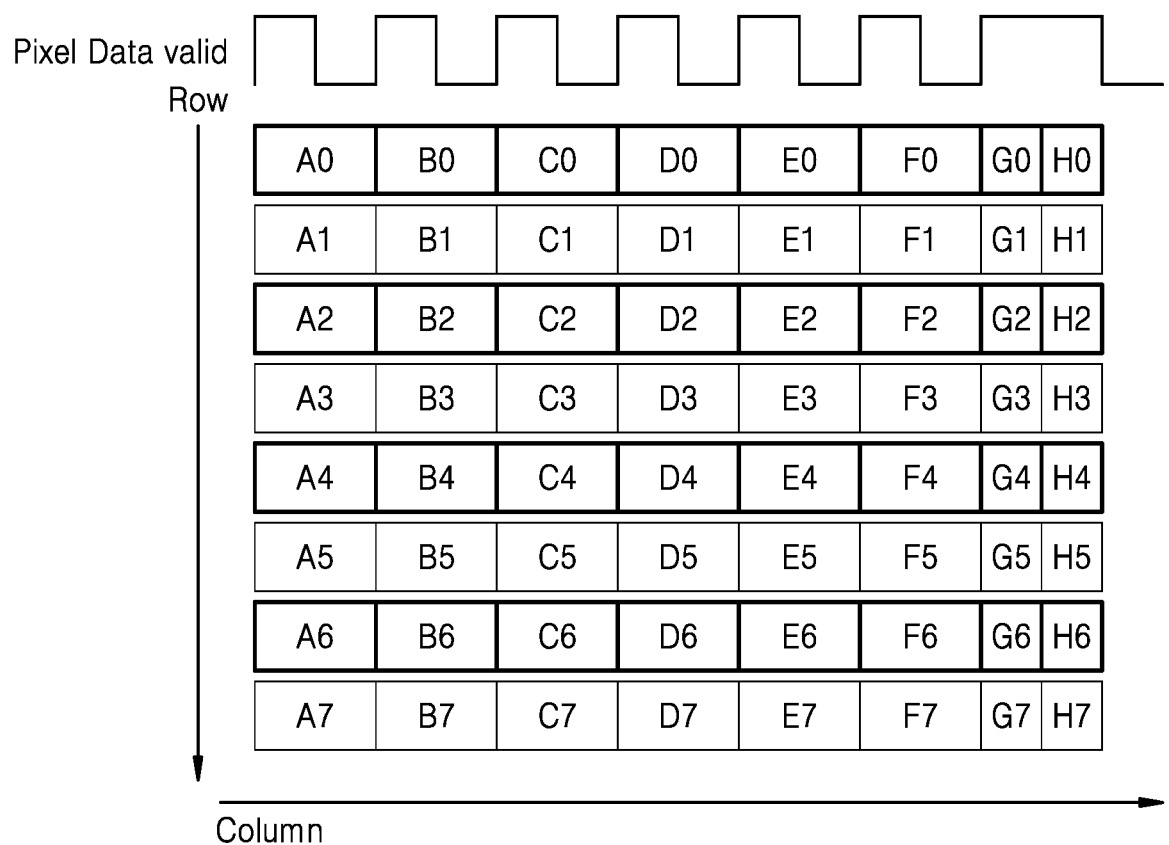
FIG. 13 is a diagram illustrating a method of reading out pixel data to perform an image processing method when pixel data is discontinuously input, according to some embodiments.
Figure 14:
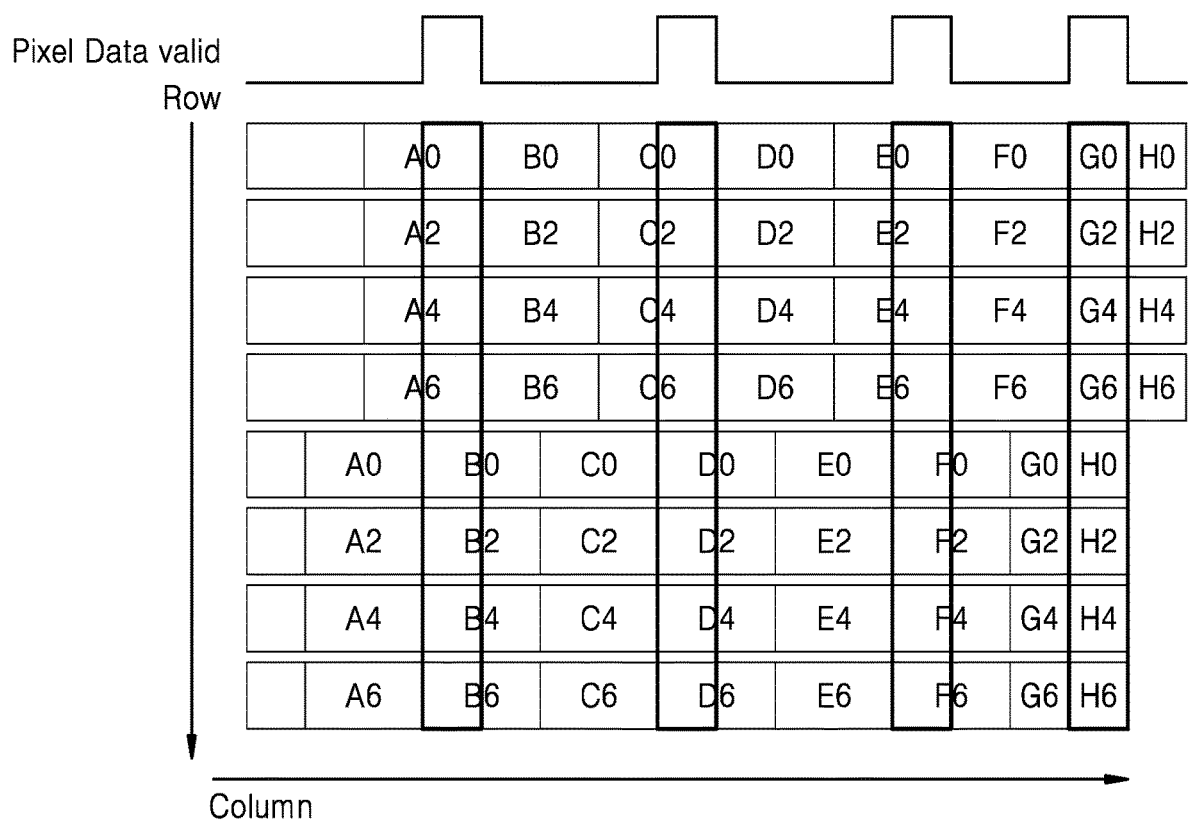
FIG. 14 is a diagram illustrating a result of reading out pixel data according to an image processing method when pixel data is discontinuously input, according to some embodiments.

FIG. 13 illustrates a method of reading out pixel data to perform an image processing method when pixel data is irregularly input, according to some embodiments, and FIG. 14 illustrates a result of reading out pixel data according to an image processing method when pixel data is irregularly input, according to some embodiments Referring to FIG. 13, pixel data may be irregularly input to the test image generator 161. For example, input speeds of a G row and an H row of FIG. 13 are different from input speeds of an A row to an F row. That is, when a row region of pixel data according to the disclosed embodiment is input, input patterns of valid pixel data may be different from each other. When the input patterns of valid pixel data of each pixel data is different from each other, the test image generator 161 may determine an input pattern of valid pixel data of pixel data and adjust a size of valid pixel data for reading out the pixel data. According to some embodiments, when the input patterns of the G row and the H row have a difference of ½ pixel size from the input patterns of other pixel data, a valid pixel data readout signal for reading out the pixel data of the G row and the H row at once may be generated.

Referring to FIG. 14, the test image generator 161 may divide columns of all row regions despite irregularly input pixel data in the embodiment of FIG. 13 by adjusting a readout signal corresponding to valid pixel data. For example, in order to generate the test image data TID corresponding to a difference in input pixel interval between pixel data G0, G4, H0, and H4, an arrangement of a sixth column (Pixel Data 6) and a seventh column (Pixel data 7) may be adjusted, and as a result, pixel data may be read out by a clock signal corresponding to input patterns of the pixel data G0, G4, H0, and H4.

Figure 15:
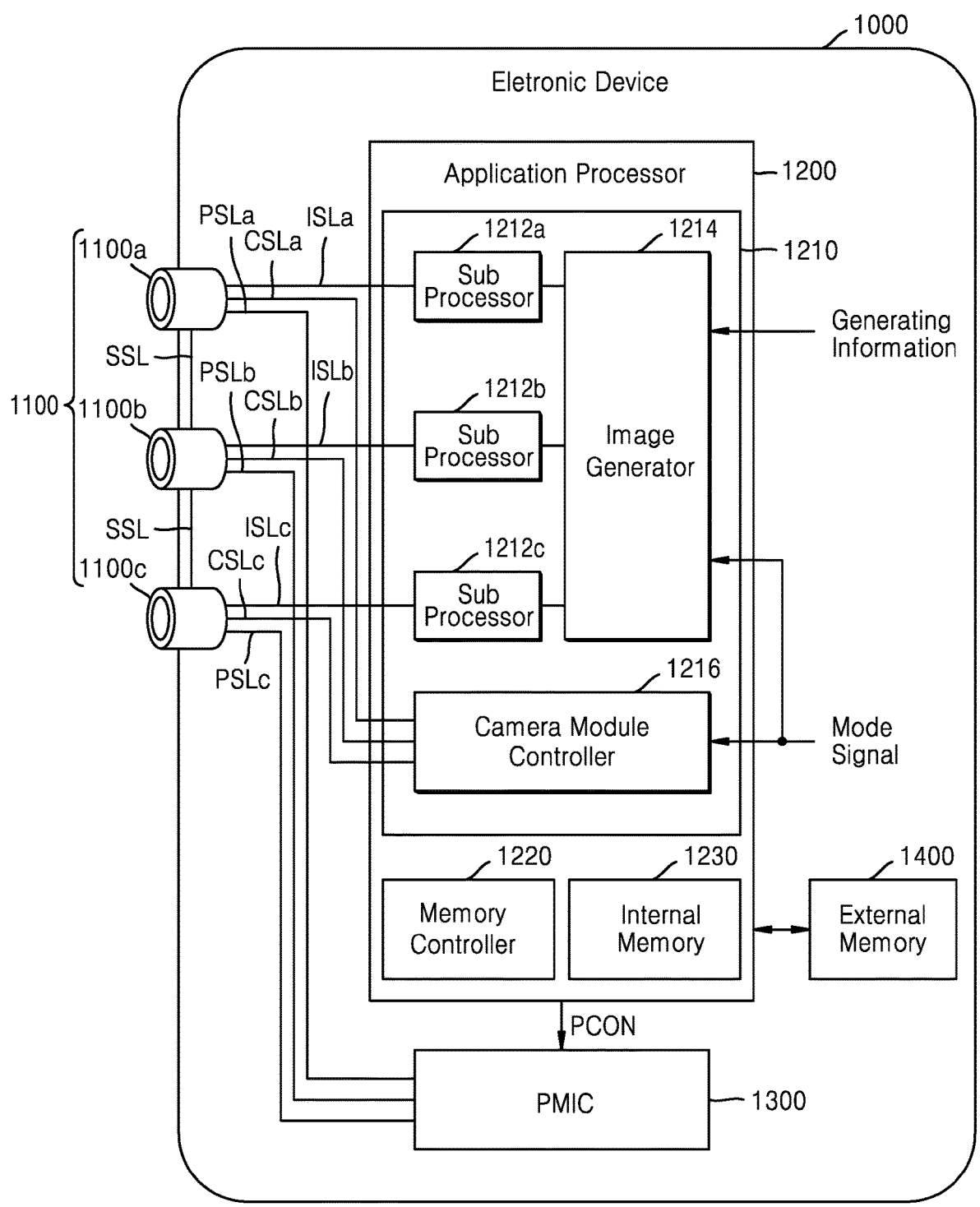
FIGS. 15 and 16 are block diagrams of an electronic device including a multi-camera module to which some embodiments may be applied.
Figure 17:
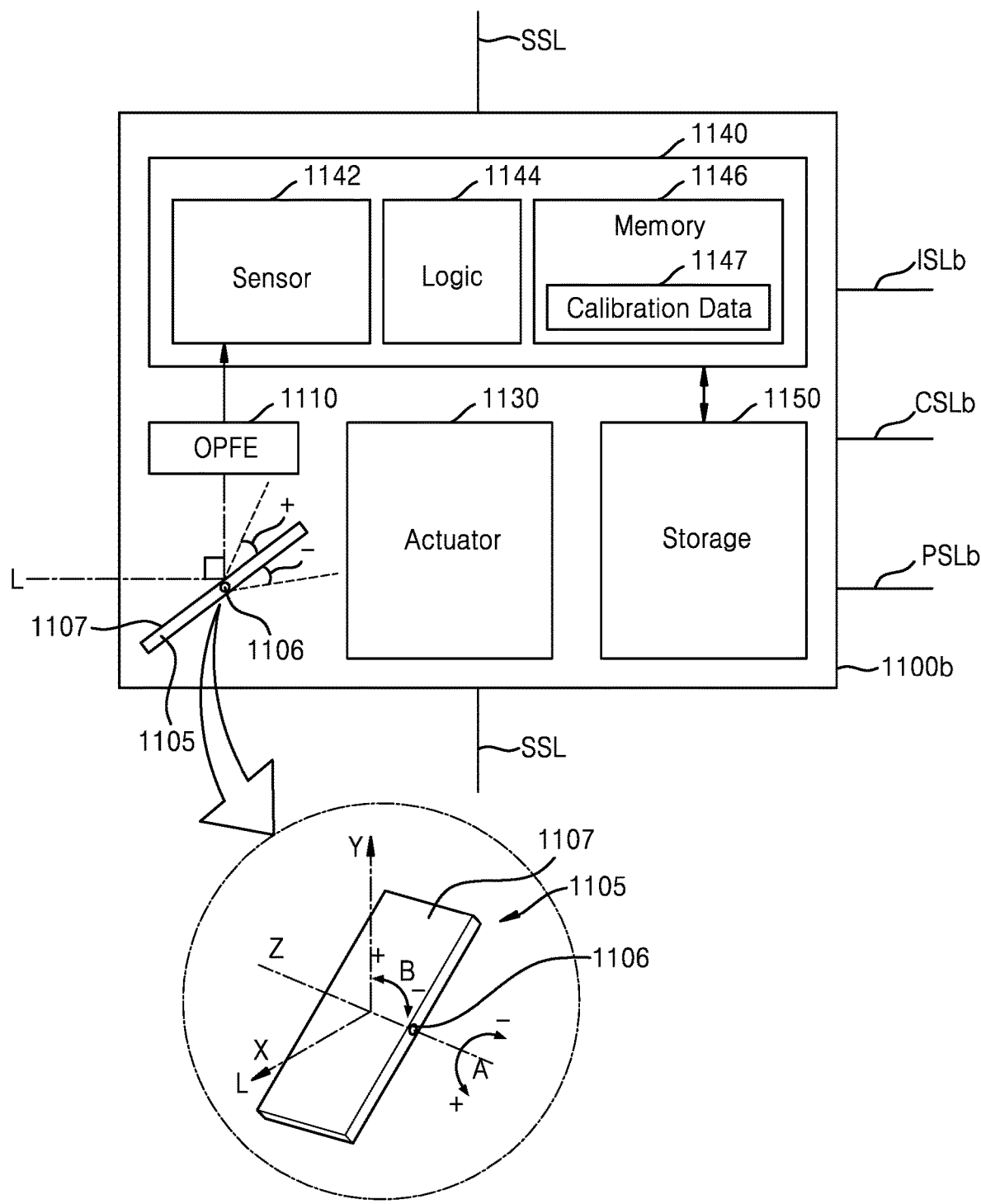
FIG. 17 is a detailed block diagram of a camera module according to some embodiments.

FIG. 15 is a block diagram of an electronic device including multiple camera modules to which some embodiments according to the inventive concept may be applied. FIG. 17 is a detailed block diagram of the camera module of FIG. 15.

Referring to FIG. 15, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although FIG. 15 illustrates some embodiments in which three camera modules 1100a, 1100b, and 1100c are arranged, embodiments are not limited thereto. In some embodiments, the camera module group 1100 may be changed to include only two camera modules or n (n is a natural number greater than or equal to 4) camera modules.

Hereinafter, a detailed configuration of the camera module 1100b will be described in more detail with reference to FIG. 17, but the following description may be equally applied to other camera modules 1100a and 1100c according to some embodiments.

Referring to FIG. 17, the camera module 1100b may include a prism 1105, an optical path folding element (hereinafter, referred to as an "OPFE") 1110, an actuator 1130, an image sensing device 1140, and a storage 1150

The prism 1105 may include a reflective surface 1107 of a light reflective material to change a path of light L incident from the outside.

In some embodiments, the prism 1105 may change a path of the light L incident in a first direction X to a second direction Y perpendicular to the first direction X. In addition, the prism 1105 may change the path of the light L incident in the first direction X to the second direction Y perpendicular to the first direction X by rotating the reflective surface 1107 of the light reflective material in an A direction about a central axis 1106 or rotating the central axis 1106 in a B direction. In this case, the OPFE 1110 may also move in a third direction Z perpendicular to the first and second directions X and Y.

In some embodiments, as illustrated, the greatest rotation angle of the prism 1105 in the A direction may be less than or equal to 15 degrees in a positive (+) A direction and greater than 15 degrees in a negative (−) A direction, but embodiments are not limited thereto.

In some embodiments, the prism 1105 is movable about 20 degrees in a positive (+) or negative (−) B direction, or between 10 degrees and 20 degrees, or between 15 degrees and 20 degrees, wherein the prism 1105 may move at the same angle in the positive (+) or negative (−) direction B or may move up to an almost similar angle within a range of about 1 degree.

In some embodiments, the prism 1105 may move the reflective surface 1107 of the light reflective material in a third direction (for example, the Z direction) parallel to an extension direction of the central axis 1106.

In some embodiments, the camera module 1100b may include two or more prisms to variously change a path of the light L incident in the first direction X to the second direction Y perpendicular to the first direction X, again to the first direction X or the third direction Z, and again to the second direction Y, and so on by using the prisms.

The OPFE 1110 may include an optical lens including a group of, for example, m (here, m is a natural number) lenses. The m lenses may move in the second direction Y to change an optical zoom ratio of the camera module 1100b. For example, when a basic optical zoom ratio of the camera module 1100b is referred to as Z, and when m optical lenses included in the OPFE 1110 are moved, the optical zoom ratio of the camera module 1100b may be changed to an optical zoom ratio of 3Z or 5Z or higher.

The actuator 1130 may move the OPFE 1110 or an optical lens (hereinafter, referred to as an optical lens) to a preset position. For example, the actuator 1130 may adjust a position of the optical lens such that the image sensor 1142 is located at a focal length of the optical lens for accurate sensing.

The image sensing device 1140 may include an image sensor 1142, a control logic 1144, and a memory 1146. The image sensor 1142 may sense an image of a sensing target by using light L provided through an optical lens. The control logic 1144 may control all operations of the camera module 1100b and process the sensed image. For example, the control logic 1144 may control an operation of the camera module 1100b in response to a control signal provided through a control signal line CSLb and extract image data (for example, the face, arms, legs, and so on of a person in an image) corresponding to a preset image in the sensed image.

In some embodiments, the control logic 1144 may perform image processing, such as encoding and noise reduction of the sensed image.

The memory 1146 may store information necessary for the operation of the camera module 1100b, such as calibration data 1147. The calibration data 1147 is information necessary for the camera module 1100b to generate image data by using the light L provided from the outside and may include, for example, information on a degree of rotation, information on a focal length, information on an optical axis, and so on. When the camera module 1100b is implemented in the form of a multi-state camera in which a focal length is changed depending on positions of an optical lens, the calibration data 1147 may include a focal length value for each position (or state) of the optical lens and information on auto focusing.

The storage 1150 may store image data sensed by the image sensor 1142. The storage 1150 may be outside the image sensing device 1140 and may be implemented in a stacked form with a sensor chip included in the image sensing device 1140. In some embodiments, the image sensor 1142 is configured as a first chip, and the control logic 1144, the storage 1150, and the memory 1146 are configured as a second chip such that one of the two chips may be stacked on the other.

In some embodiments, the storage 1150 may include an electrically erasable programmable read-only memory (EEPROM), but embodiments are not limited thereto. In some embodiments, the image sensor 1142 may include a pixel array, and the control logic 1144 may include an analog-to-digital converter and an image signal processing unit for processing a sensed image.

Referring to FIGS. 15 and 17, in some embodiments, each of the plurality of camera modules 1100a, 1100b, and 1100c may include the actuator 1130. Accordingly, each of the plurality of camera modules 1100a, 1100b, and 1100c may include the same or different calibration data 1147 according to an operation of the actuator 1130 included in the respective camera module.

In some embodiments, one camera module (for example, 1100b) of the plurality of camera modules 1100a, 1100b, and 1100c is a folded-lens-type camera module including the prism 1105 and the OPFE 1110 described above, and the other camera modules (for example, 1100a and 1100c) may be a vertical-type camera module that does not include the prism 1105 and the OPFE 1110, but are not limited thereto.

In some embodiments, one camera module (for example, 1100c) of the plurality of camera modules 1100a, 1100b, and 1100c may be a vertical-type depth camera that extracts depth information by using, for example, infrared ray (IR). In this case, the application processor 1200 may merge image data received from the depth camera and image data received from another camera module (for example, 1100a or 1100b) to generate a three-dimensional (3D) depth image.

In some embodiments, at least two camera modules (for example, 1100a and 1100b) of the plurality of camera modules 1100a, 1100b, and 1100c may have different fields of view (viewing angles). In this case, for example, optical lenses of at least two camera modules (for example, 1100a and 1100b) of the plurality of camera modules 1100a, 1100b, and 1100c may be different from each other, but embodiments are not limited thereto.

In addition, in some embodiments, viewing angles of the plurality of camera modules 1100a, 1100b, and 1100c may be different from each other. For example, the camera module 1100a may be an ultrawide camera, the camera module 1100b may be a wide camera, and the camera module 1100c may be a tele camera, but embodiments are not limited thereto. In this case, optical lenses respectively included in the plurality of camera modules 1100a, 1100b, and 1100c may also be different from each other, but embodiments are not limited thereto.

In some embodiments, the plurality of camera modules 1100a, 1100b, and 1100c may be physically separated from each other. That is, a sensing region of one image sensor 1142 is not divided by the plurality of camera modules 1100a, 1100b, and 1100c to be used, but the plurality of camera modules 1100a, 1100b, and 1100c may each include an independent image sensor 1142.

Referring back to FIG. 15, the application processor 1200 may include an image processing device 1210, a memory controller 1220, and an internal memory 1230. The application processor 1200 may be separated from the plurality of camera modules 1100a, 1100b, and 1100c as, for example, a separate semiconductor chip.

The image processing device 1210 may include a plurality of sub image processors 1212a, 1212b, and 1212c, an image generator 1214, and a camera module controller 1216.

The image processing device 1210 may include the number of sub image processors 1212a, 1212b, and 1212c corresponding to the number of camera modules 1100a, 1100b, and 1100c.

Image data generated by the camera module 1100a may be provided to the sub image processor 1212a through an image signal line ISLa, image data generated by the camera module 1100b may be provided to the sub image processor 1212b through an image signal line ISLb, and image data generated by the camera module 1100c may be provided to the sub image processor 1212c through an image signal line ISLc. The image data may be transmitted by using, for example, a camera serial interface (CSI) based on a MIPI, but embodiments are not limited thereto.

In some embodiments, one sub image processor may also be arranged to correspond to a plurality of camera modules. For example, the sub image processor 1212a and the sub image processor 1212c are not separated from each other as illustrated but may be integrated into one sub image processor, and the image data provided from the camera modules 1100a and 1100c may be selected by a selection element (for example, a multiplexer) or so on, and then may be provided to an integrated sub image processor. In this case, the sub image processor 1212b may receive image data from the camera module 1100b without being integrated.

In some embodiments, image data generated by the camera module 1100a may be provided to the sub image processor 1212a through an image signal line ISLa, image data generated by the camera module 1100b may be provided to the sub image processor 1212b through an image signal line ISLb, and image data generated by the camera module 1100c may be provided to the sub image processor 1212c through an image signal line ISLc. The image data processed by the sub image processor 1212b may be directly provided to the image generator 1214, but image data processed by the sub image processor 1212a and image data processed by the sub image processor 1212c may be selected by a selection element (for example, a multiplexer) or so on and then may be provided to the image generator 1214.

Each of the sub image processors 1212a, 1212b, and 1212c may perform image processing, such as bad pixel correction, 3A (auto-focus correction, auto-white balance, and auto-exposure) adjustment, noise reduction, sharpening, gamma control, and/or remosaic for image data provided from the camera modules 1100a, 1100b, and 1100c.

In some embodiments, remosaic signal processing may be performed by each of the camera modules 1100a, 1100b, and 1100c, and then may also be provided to the sub image processors 1212a, 1212b, and 1212c.

Image data processed by each of the sub image processors 1212a, 1212b, and 1212c may be provided to the image generator 1214. The image generator 1214 may generate an output image by using the image data provided from each of the sub image processors 1212a, 1212b, and 1212c in response to image generating information or a mode signal.

Specifically, the image generator 1214 may generate the output image by merging at least a part of the image data generated by the image processors 1212a, 1212b, and 1212c in response to the image generation information or the mode signal. In addition, the image generator 1214 may generate the output image by selecting any one of the image data generated by the image processors 1212a, 1212b, and 1212c in response to the image generation information or the mode signal.

In some embodiments, the image generation information may include a zoom signal or a zoom factor. In addition, in some embodiments, the mode signal may be based on, for example, a mode selected by a user.

When an image generation information is a zoom signal (a zoom factor), and when the respective camera modules 1100a, 1100b, and 1100c have different fields of view (viewing angles), the image generator 1214 may perform different operations depending on the type of the zoom signal. For example, when the zoom signal is a first signal, an output image may be generated by using image data output from the sub image processor 1212a and image data output from the sub image processor 1212b among image data output from the sub image processor 1212a and image data output from the sub image processor 1212c. When the zoom signal is a second signal different from the first signal, the image generator 1214 may generate an output image by using the image data output from the sub image processor 1212c and the image data output from the sub image processor 1212b among the image data output from the sub image processor 1212a and the image data output from the sub image processor 1212c. When the zoom signal is a third signal different from the first and second signals, the image generator 1214 may generate an output image by selecting any one from among image data output from the respective sub image processors 1212a, 1212b, and 1212c without merging the image data. However, embodiments are not limited thereto, and a method of processing image data may be changed as needed.

Figure 16:
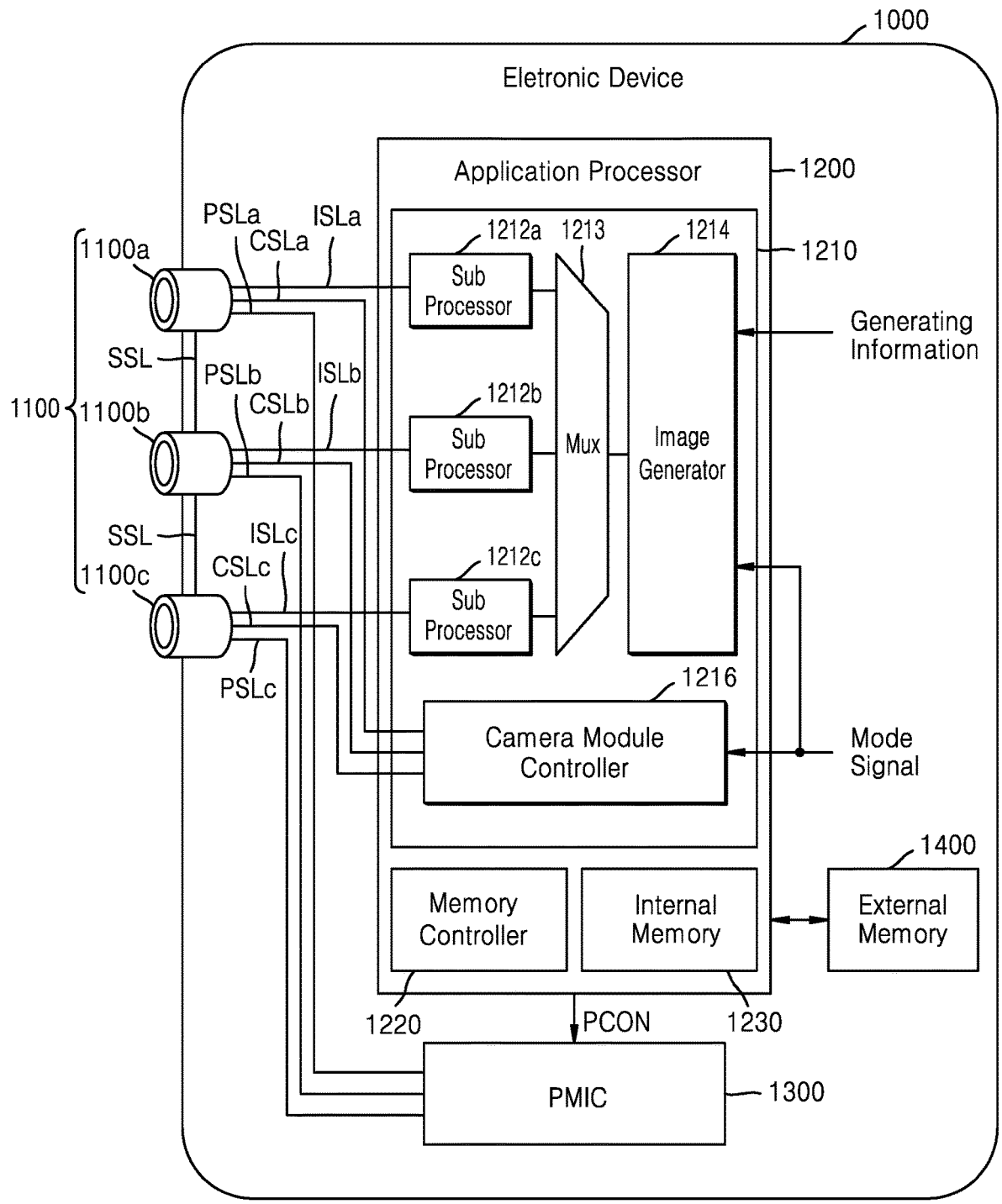

Referring to FIG. 16, in some embodiments, the image processing device 1210 may further include a multiplexor or selector 1213 that selects outputs of the sub image processors 1212a, 1212b, and 1212c and transmits the selected outputs to the image generator 1214.

In this case, the selector 1213 may perform different operations according to a zoom signal or a zoom factor. For example, when the zoom signal is a fourth signal (for example, a zoom ratio is a first ratio), the selector 1213 may select any one of the outputs of the sub image processors 1212a, 1212b, and 1212c and transmit the selected output to the image generator 1214.

In addition, when the zoom signal is a fifth signal different from the fourth signal (for example, the zoom ratio is a second ratio), the selector 1213 may sequentially transmit p (p is a natural number greater than or equal to 2) outputs among the outputs of the sub image processors 1212a, 1212b, and 1212c to the image generator 1214. For example, the selector 1213 may sequentially transmit the output of the sub image processor 1212b and the output of the sub image processor 1212c to the image generator 1214. In addition, the selector 1213 may sequentially transmit the output of the sub image processor 1212a and the output of the sub image processor 1212b to the image generator 1214. The image generator 1214 may generate one output image by merging the sequentially provided p outputs.

Here, the sub image processors 1212a, 1212b, and 1212c performs image processing, such as demosaic, down-scaling to a video/preview resolution size, gamma correction, and high dynamic range (HDR) processing, and the processed image data is transmitted to the image generator 1214. Accordingly, even when the processed image data is provided to the image generator 1214 through the selector 1213 and one signal line, an image merging operation of the image generator 1214 may be performed at high speed.

In some embodiments, the image generator 1214 may receive a plurality of image data having different exposure times from at least one of the plurality of sub image processors 1212a, 1212b, and 1212c and perform a high dynamic range (HDR) for the plurality of image data, and thus, merged image data having an increased dynamic range may be generated.

The camera module controller 1216 may provide control signals respectively to the camera modules 1100a, 1100b, and 1100c. The control signals generated by the camera module controller 1216 may be respectively provided to the camera modules 1100a, 1100b, and 1100c through the control signal lines CSLa, CSLb, and CSLc separated from each other.

Any one of the plurality of camera modules 1100a, 1100b, and 1100c may be designated as a master camera (for example, 1100b) according to either image generation information including a zoom signal or a mode signal, and the other camera modules (for example, 1100a and 1100c) may be designated as slave cameras. The information may be included in the control signals and respectively provided to the camera modules 1100a, 1100b, and 1100c through the control signal lines CSLa, CSLb, and CSLc separated from each other.

Camera modules operating as a master and a slave may be changed according to a zoom factor or an operation mode signal. For example, when a viewing angle of the camera module 1100a is wider than a viewing angle of the camera module 1100b and a zoom factor indicates a low zoom ratio, the camera module 1100a may operate as a master, and the camera module 1100b may operate as a slave. In contrast to this, when the zoom factor indicates a high zoom ratio, the camera module 1100b may operate as a master and the camera module 1100a may operate as a slave.

In some embodiments, the control signals provided from the camera module controller 1216 to the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b receiving the sync enable signal may generate a sync signal based on the received sync enable signal and transmit the generated sync signal to the camera modules 1100a and 1100c. The camera module 1100b and the camera modules 1100a and 1100c may be synchronized to the sync signal to transmit image data to the application processor 1200.

In some embodiments, the control signals provided from the camera module controller 1216 to the plurality of camera modules 1100a, 1100b, and 1100c may each include mode information according to a mode signal. Based on the mode information, the plurality of camera modules 1100a, 1100b, and 1100c may operate in a first operation mode and a second operation mode in relation to a sensing speed.

The plurality of camera modules 1100a, 1100b, and 1100c may generate (for example, generate an image signal of a first frame rate) an image signal at a first speed in the first operation mode, encode (for example, encode an image signal of a second frame rate higher than the first frame rate) the image signal at a second speed higher than the first speed, and transmit the encoded image signal to the application processor 1200. In this case, the second speed may be 30 times or less of the first speed.

The application processor 1200 may store the received image signal, that is, the encoded image signal in the internal memory 1230 provided therein or the external memory 1400 outside the application processor 1200, and then read the encoded image signal from the internal memory 1230 or the external memory 1400 and decode the read image signal, and display image data generated based on the decoded image signal may be displayed. For example, one of the plurality of sub image processors 1212a, 1212b, and 1212c of the image processing device 1210 may perform decoding, and also perform image processing for the decoded image signal.

The plurality of camera modules 1100a, 1100b, and 1100c may generate (for example, generate an image signal of a third frame rate lower than the first frame rate) an image signal at a third speed lower than the first speed in the second operation mode and may transmit the image signal to the application processor 1200. The image signal provided to the application processor 1200 may be an unencoded signal. The application processor 1200 may perform image processing for the received image signal or store the image signal in the internal memory 1230 or the external memory 1400.

The PMIC 1300 may supply power, for example, a power supply voltage, to each of the plurality of camera modules 1100a, 1100b, and 1100c. For example, the PMIC 1300 may supply first power to the camera module 1100a through a power signal line PSLa, second power to the camera module 1100b through a power signal line PSLb, and third power to the camera module 1100c through a power signal line PSLc, by the control of the application processor 1200.

The PMIC 1300 may generate power corresponding to each of the plurality of camera modules 1100a, 1100b, and 1100c in response to a power control signal PCON from the application processor 1200 and adjust a level of the power. The power control signal PCON may include a power adjustment signal for each operation mode of the plurality of camera modules 1100a, 1100b, and 1100c. For example, an operation mode may include a low power mode, and in this case, the power control signal PCON may include information on a camera module operating in a low power mode and a set power level. Levels of powers respectively provided to the plurality of camera modules 1100a, 1100b, and 1100c may be the same as or different from each other. In addition, the levels of powers may be changed dynamically.

While the inventive concept has been particularly shown and described with reference to embodiments thereof, it will be understood that various changes in form and details may be made therein without departing from the spirit and scope of the following claims.

What is claimed is:

1. An image sensor comprising:
a test image generator configured to receive pixel data of a group of pixels comprising a channel that corresponds to a size of a plurality of row regions of a pixel array, wherein the pixel array comprises the plurality of row regions and a plurality of column regions, wherein the test image generator is configured to generate test image data based on the pixel data; and
an interface configured to transmit the test image data from the test image generator to a test device,
wherein the test image generator is configured to divide the pixel data into a first column region corresponding to a 2n-th column region of the column regions of the pixel data and a second column region corresponding to a 2n−1-th column region of the column regions of the pixel data and is further configured to generate a test image based on the first column region.

2. The image sensor of claim 1, wherein the test image generator is configured to generate the test image according to an arrangement of residual pixels in the first column region, when a size of the pixel data corresponds to a number of pixels included in the channel times n is input and n is an odd number.

3. The image sensor of claim 1, wherein the test image generator is configured to generate the test image in response to a clock signal corresponding to valid pixel data of the row regions of the pixel data, when the pixel data is discontinuously input.

4. The image sensor of claim 1, wherein the test image generator is further configured to divide the pixel data into a first column region corresponding to a 4n-th column region among the column regions of the pixel data, a second column region corresponding to a 4n−1-th column region among the column regions of the pixel data, a third column region corresponding to a 4n−2-th column region among the column regions of the pixel data, and a fourth column region corresponding to a 4n−3-th column region among the column regions of the pixel data, and is further configured to generate the test image based on the first column region.

5. The image sensor of claim 4, wherein the test image generator is further configured to include residual pixels in the first column region, when pixel data corresponding to the number of pixels included in the channel times n is input and the number of pixels included in the channel is not divisible by 4.

6. The image sensor of claim 4, wherein the interface is configured to transmit the test image at a speed corresponding to ¼ of an input speed of the pixel data.

7. The image sensor of claim 4, wherein the test image generator is configured to generate the test image based on each of the second column region, the third column region, and the fourth column region.

8. The image sensor of claim 1, wherein the interface is configured to transmit the test image at a speed corresponding to ½ of an input speed of the pixel data.

9. The image sensor of claim 1, wherein the test image generator is configured to generate the test image based on the second column region.

10. An image processing method for inspecting performance of an image sensor, wherein a plurality of row regions and a plurality of column regions are in a pixel array, the image processing method comprising:
receiving pixel data in units of channels that correspond to sizes of the row regions;
generating test image data based on the pixel data; and
transmitting the test image data to a test device,
wherein, the generating the test image data comprises dividing the pixel data into a first column region corresponding to a 2n-th column region of the column regions of the pixel data and a second column region corresponding to a 2n−1-th column region of the column regions of the pixel data, and
wherein a test image is generated based on the first column region.

11. The image processing method of claim 10, wherein the generating the test image data further comprises:

when pixel data corresponding to a number of pixels included in the channel times n is input and n is an odd number, including residual pixels in the first column region.

12. The image processing method of claim 10, wherein the generating the test image data further comprises:
when the pixel data is discontinuously input, generating the test image in response to a clock signal corresponding to valid pixel data of the row regions of the pixel data.

13. The image processing method of claim 10, wherein the generating the test image data further comprises:
dividing the pixel data into a first column region corresponding to a 4n-th column region among the column regions of the pixel data, a second column region corresponding to 4n−1-th column region among the column regions of the pixel data, a third column region corresponding to 4n−2-th column region among the column regions of the pixel data, and a fourth column region corresponding to 4n−3-th column region among the column regions of the pixel data; and
generating the test image based on the first column region.

14. The image processing method of claim 13, wherein the generating the test image data further comprises:
when pixel data corresponding to a number of pixels included in the channel times n is input and the number of pixels included in the channel is not divisible by 4, generating the test image according to an arrangement of residual pixels in the first column region.

15. The image processing method of claim 13, wherein the generating the test image data further comprises:
generating the test image based on each of the second column region, the third column region, and the fourth column region.

16. The image processing method of claim 10, wherein the generating the test image data further comprises:
generating the test image based on the second column region.

17. A processor of an image sensor, the processor comprising:
a test image generator configured to receive pixel data of a group of pixels comprising a channel that corresponds to a size of a plurality of row regions of a pixel array, wherein the pixel array comprises the plurality of row regions and a plurality of column regions, wherein the test image generator is configured to generate test image data based on the pixel data; and
an interface configured to transmit the test image data from the test image generator to a test device,
wherein the test image generator is configured to divide the pixel data into a first column region corresponding to a 2n-th column region of the column regions of the pixel data and a second column region corresponding to a 2n−1-th column region of the column regions of the pixel data and is further configured to generate a test image based on the first column region.

18. The processor of claim 17, wherein the test image generator is further configured to divide the pixel data into a first column region corresponding to a 4n-th column region among the column regions of the pixel data, a second column region corresponding to 4n−1-th column region among the column regions of the pixel data, a third column region corresponding to 4n−2-th column region among the column regions of the pixel data, and a fourth column region corresponding to 4n−3-th column region among the column regions of the pixel data, and is further configured to generate the test image based on the first column region.

19. The processor of claim 17, wherein the test image generator is further configured to generate the test image according to an arrangement of residual pixels in the first column region, when pixel data corresponding to a number of pixels included in the channel times n is input and n is an odd number.

\* \* \* \* \*